United States Patent
Liu et al.

(10) Patent No.: US 11,314,256 B2
(45) Date of Patent: *Apr. 26, 2022

(54) MECHANICAL TRANSMISSION CONTROL METHOD AND SYSTEM FOR USE WITH INTELLIGENT WHEELCHAIR

(71) Applicant: SICHUAN GOLDEN RIDGE INTELLIGENCE SCIENCE & TECHNOLOGY CO., LTD., Chengdu (CN)

(72) Inventors: Weirong Liu, Beijing (CN); Jiaxin Li, Chengdu (CN); Yin Jiao, Gothenburg (SE); Li Yan, Gothenburg (SE); Dong Dong, Gothenburg (SE); Yifeng Huang, Gothenburg (SE)

(73) Assignee: SICHUAN GOLDEN RIDGE INTELLIGENCE SCIENCE & TECHNOLOGY CO., LTD., Chengdu (CN)

( * ) Notice: Subject to any disclaimer, the term of this patent is extended or adjusted under 35 U.S.C. 154(b) by 365 days.

This patent is subject to a terminal disclaimer.

(21) Appl. No.: 16/474,060

(22) PCT Filed: Jan. 22, 2017

(86) PCT No.: PCT/CN2017/072103
§ 371 (c)(1),
(2) Date: Jun. 26, 2019

(87) PCT Pub. No.: WO2018/133076
PCT Pub. Date: Jul. 26, 2018

(65) Prior Publication Data
US 2019/0391584 A1 Dec. 26, 2019

(51) Int. Cl.
*G05D 1/02* (2020.01)
*B60K 7/00* (2006.01)
(Continued)

(52) U.S. Cl.
CPC ......... *G05D 1/0212* (2013.01); *B60K 7/0007* (2013.01); *F16M 11/2042* (2013.01);
(Continued)

(58) Field of Classification Search
CPC .. G05D 1/0212; G05D 1/0088; G05D 1/0246; G05D 1/027; G05D 2201/0206;
(Continued)

(56) References Cited

U.S. PATENT DOCUMENTS

2007/0198145 A1* 8/2007 Norris ............... G05D 1/021
701/23
2010/0017124 A1 1/2010 Zhao et al.
(Continued)

FOREIGN PATENT DOCUMENTS

CN 101190158 A 6/2008
CN 102188311 A 9/2011
(Continued)

OTHER PUBLICATIONS

Second Office Action in Chinese Application No. 201780077308.8 dated Aug. 25, 2020, 16 pages.
(Continued)

*Primary Examiner* — Richard M Camby
(74) *Attorney, Agent, or Firm* — Metis IP LLC

(57) ABSTRACT

The present disclosure discloses a method and system for controlling mechanical transmission of an intelligent wheelchair. The system may include a processor, a motion module, and a tripod head. The processor may be configured to perform operations of receiving information, constructing a map, planning a route, and generating a control parameter. The motion module may execute the control parameter to move around and may include a sensor to sense information. The tripod head may include a sensor to sense the information.

20 Claims, 21 Drawing Sheets

(51) Int. Cl.
*F16M 11/20* (2006.01)
*G05D 1/00* (2006.01)
*A61G 5/04* (2013.01)
*A61G 5/10* (2006.01)

(52) U.S. Cl.
CPC ........... *G05D 1/0088* (2013.01); *G05D 1/027* (2013.01); *G05D 1/0246* (2013.01); *A61G 5/04* (2013.01); *A61G 5/10* (2013.01); *G05D 2201/0206* (2013.01)

(58) Field of Classification Search
CPC ............... G05D 1/0274; B60K 7/0007; F16M 11/2042; A61G 5/04; A61G 5/10; A61G 5/1051; G01C 21/005
See application file for complete search history.

(56) References Cited

U.S. PATENT DOCUMENTS

| | | | | |
|---|---|---|---|---|
| 2011/0043515 | A1* | 2/2011 | Stathis | G06T 17/00 345/419 |
| 2019/0090472 | A1* | 3/2019 | Crinklaw | A01M 7/0014 |
| 2021/0129345 | A1* | 5/2021 | Liu | A61B 5/02055 |

FOREIGN PATENT DOCUMENTS

| | | |
|---|---|---|
| CN | 102323819 A | 1/2012 |
| CN | 102631265 A | 8/2012 |
| CN | 105203094 A | 12/2015 |
| CN | 105411490 A | 3/2016 |
| CN | 105652870 A | 6/2016 |
| CN | 105681747 A | 6/2016 |
| CN | 106289285 A | 1/2017 |
| CN | 106334283 A | 1/2017 |
| CN | 106338996 A | 1/2017 |
| JP | 2004321722 A | 11/2004 |
| WO | 2015180104 A1 | 12/2015 |

OTHER PUBLICATIONS

International Search Report In PCT/CN2017/072103 dated Oct. 19, 2017, 7 Pages.

* cited by examiner

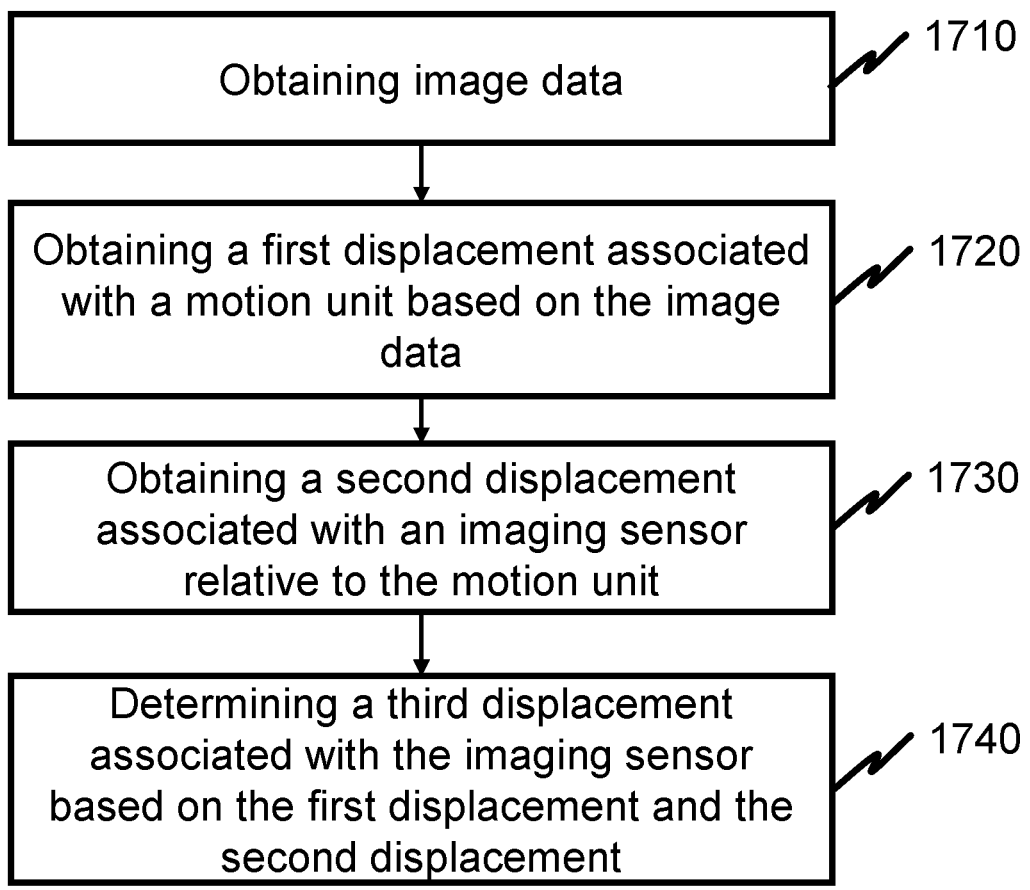
FIG. 17-A

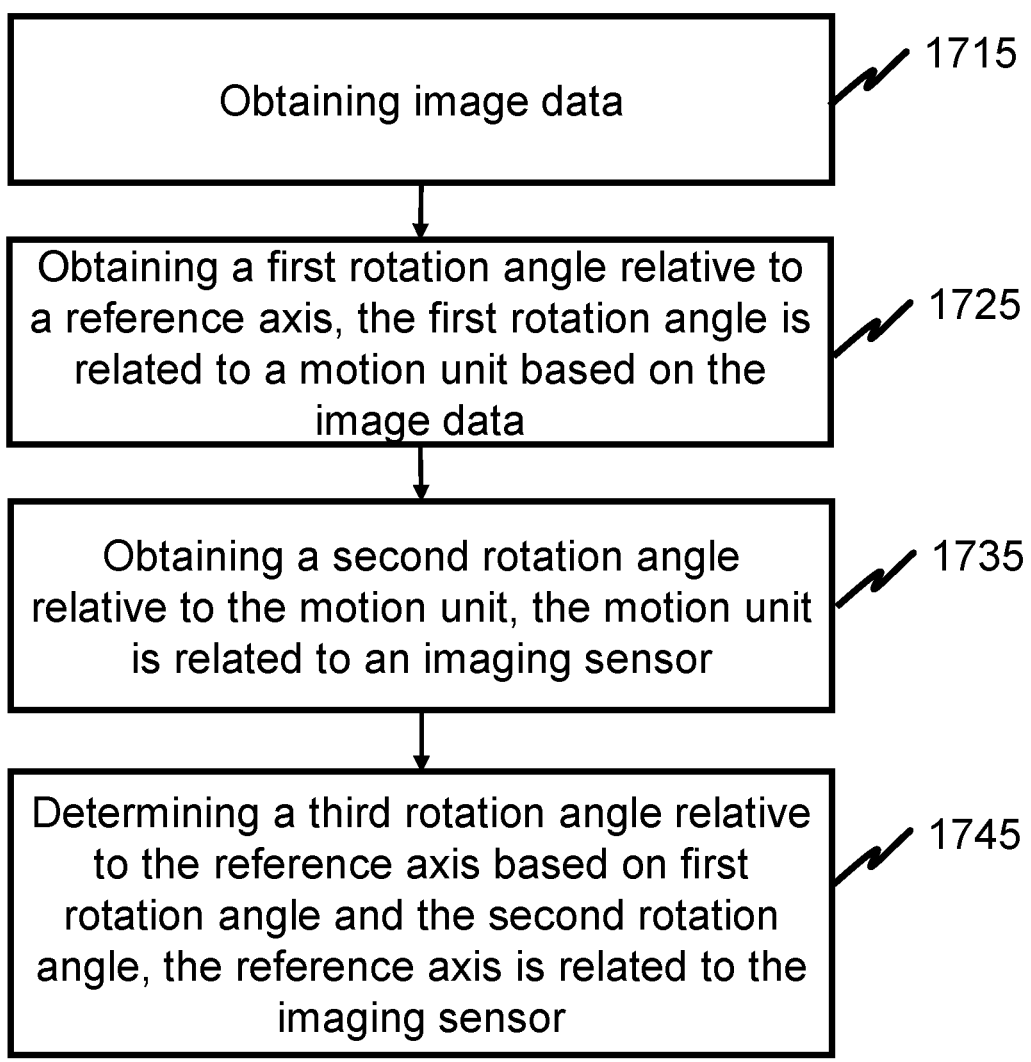
FIG. 17-B

MECHANICAL TRANSMISSION CONTROL METHOD AND SYSTEM FOR USE WITH INTELLIGENT WHEELCHAIR

This application is a National phase filing under 35 U.S.C. § 371 of International Application No. PCT/CN2017/072103 field on Jan. 22, 2017, the contents of which are incorporated herein by reference.

TECHNICAL FIELD

The present disclosure relates to methods and systems for controlling mechanical transmission of an intelligent wheelchair, and more particularly, relates to a mobile intelligent robot, and a control method for controlling image detection and processing, route search, and robot movement.

BACKGROUND

In daily life, movable intelligent devices, such as cleaning robots, intelligent balance wheels, and intelligent wheelchairs, are becoming more and more common. Intelligent wheelchairs may help people with disabilities to perform physiological functions, such as basic movements and observations of surroundings. Intelligent wheelchairs may typically use an intelligent robot system to implement functions, such as movements, senses of surroundings, and health monitoring. In order to provide services within a region, the intelligent robot system may learn surroundings according to an existing map of the region and move automatically. With the rapid expansion of demand for the services, people may expect a multi-functions intelligent robot system that is able to update a map, plan a route and move automatically, in particular, an intelligent robot that may adapt to more complex regions.

SUMMARY

An aspect of the present disclosure relates to a system. The system may include a storage storing a set of instructions, and a processor in communication with the storage. When executing the set of instructions, the processor may establish a communication with a motion module and a tripod head via a communication port. The processor may obtain information from sensors of the motion module and the tripod head to construct a map. The processor may also plan a route based on the information, and generate a control parameter based on the information.

Another aspect of the present disclosure relates to a method. The method may include establishing a communication between a motion module and a tripod head via a communication port. The method may include obtaining information from sensors of the motion module and the tripod head to construct a map. The method may also include planning a route based on the information, and generating a control parameter based on the information.

Yet another aspect of the present disclosure relates to a permanent computer readable medium embodied as a computer program product. The computer program product may include a communication port for establishing a communication between a processor and a motion module and a communication between the processor and a tripod head. The communication port may establish the communications by using an application program interface (API).

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings.

FIG. 17-A is a flowchart illustrating an exemplary process for determining an initial value of displacement according to some embodiments of the present disclosure;

FIG. 17-B is a flowchart illustrating an exemplary process for determining a robot posture according to some embodiments of the present disclosure;

DETAILED DESCRIPTION

Figure 1:
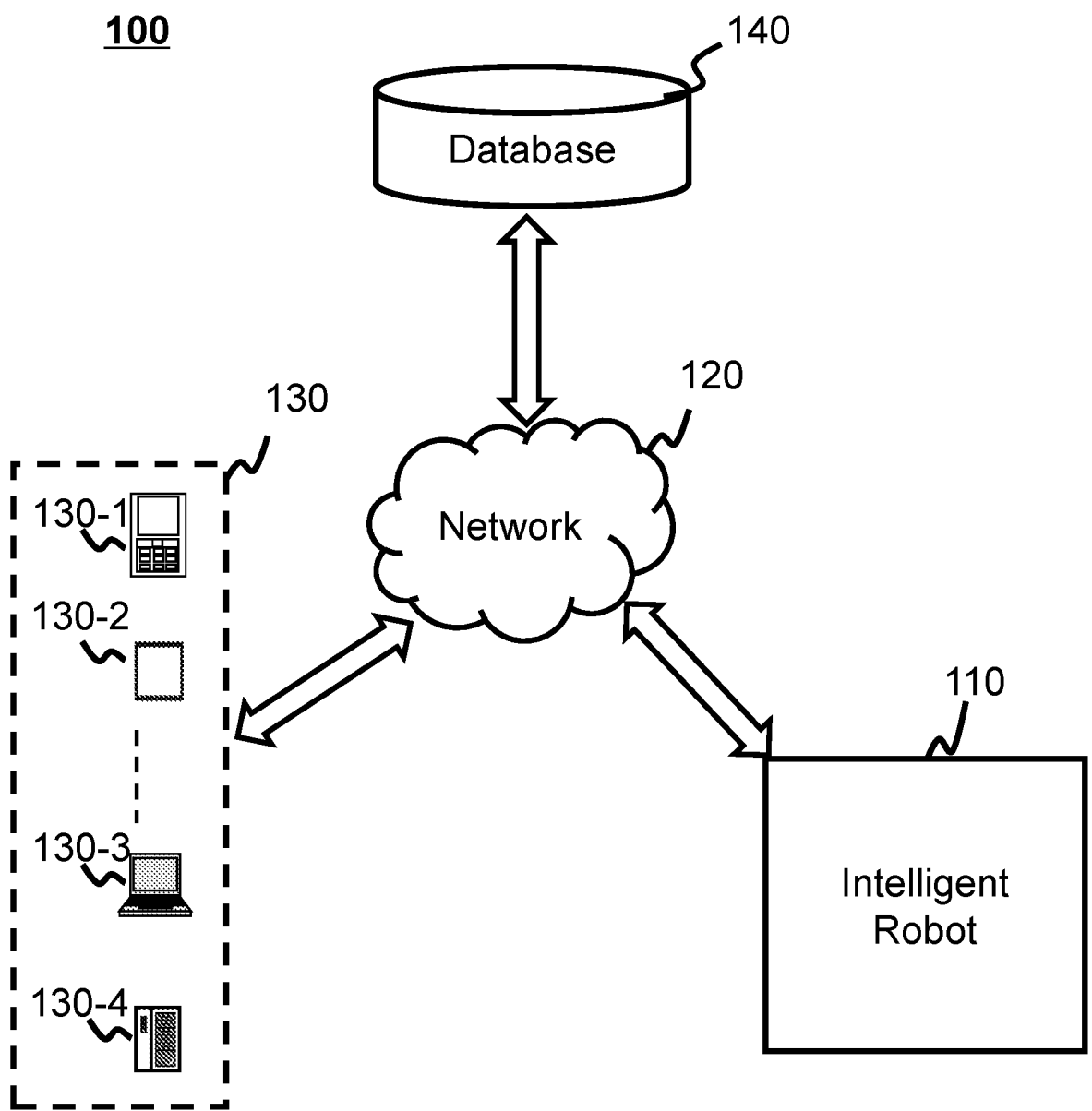
FIG. 1 is a schematic diagram illustrating a robot control system of a scanning system according to some embodiments of the present disclosure.

In the detailed descriptions below, numerous specific details of the disclosure are set forth in order to provide a thorough understanding of the disclosure. However, it will be apparent to those skilled in the art that the present disclosure may be practiced without these details. In other instances, well-known methods, procedures, systems, components, and/or circuits in the present disclosure have been described at relatively high levels elsewhere and are not described in detail in this disclosure to avoid unnecessarily repeating.

It should be understood that the terms "system," "device," "unit," and/or "module" are used in this disclosure to refer to a different component, component, portion, or component of the different levels of the order. However, if other expressions may achieve the same purpose, these terms may be replaced by other expressions.

It should be understood that when a device, a unit, or a module is referred to as "on," "connected to" or "coupled" to another device, unit, or module, it may be directly connected to, coupled to, or communicated with other devices, units or, modules on another device, unit, or module, or may be stored within the device, the unit, or the module, unless the context clearly indicates an exception. For example, the term "and/or" as used in this disclosure includes any and all combinations of one or more of the associated listed items.

The terminology used in the disclosure is only intended to describe a particular embodiment and is not intended to limit the scope of the disclosure. As used in the disclosure and the appended claims, the singular forms "a," "an," and "the" include plural referents unless the content clearly dictates otherwise. In general, the terms "include" and "comprise" are merely meant to include the features, integers, steps, operations, elements, and/or components that are specifically identified, and such expressions do not constitute an exclusive list, and other features, integers, steps, operations, elements, and/or components may be included.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure.

It is understood that the drawings are not to scale.

Moreover, the present disclosure describes only the systems and the methods for determining a status of the intelligent robot, it being understood that the description in this disclosure is merely one embodiment. The intelligent robot system or method may also be applied to any type of an intelligent device or a car other than the intelligent robot. For example, the intelligent robot system or the method may be used in different intelligent device systems, including a balance wheel, an unmanned ground vehicle (UGV), an intelligent wheelchair, or the like, or any combination thereof. The intelligent robot system may also be applied to any intelligent system including an application management and/or distribution, such as a system for sending and/or receiving express delivery and a system for carrying personnel or goods to certain locations.

The terms "robot," "intelligent robot," "intelligent device," as used in this disclosure, may be used interchangeably to refer to an apparatus, a device, or a tool that may be moved and operated automatically. The term "user device" in this disclosure may refer to a tool that may be used to request a service, subscribe to a service, or facilitate the provision of a service. The term "mobile terminal" in this disclosure may refer to a tool or an interface that may be used by a user to control an intelligent robot.

In the present disclosure, the intelligent wheelchair system may use an intelligent robot to implement functions such as moving, changing directions, stopping, sensing an environment, drawing a map, and determining a driving route. It should be noted that the intelligent robot provided in this disclosure may also be used in other fields to achieve similar functions or purposes.

The positioning technologies used in the present disclosure may include a global positioning system (GPS) technology, a global navigation satellite system (GLONASS) technology, a compass navigation system (COMPASS) technology, a Galileo positioning system (Galileo) technology, a quasi-zenith satellite system (QZSS) technology, a wireless fidelity (WIFI) positioning technology, or the like, or any combination thereof. One or more of the positioning techniques may be used interchangeably in this disclosure.

The present disclosure describes an intelligent robot control system 100 as an exemplary system and a method for constructing a map and planning a route for the intelligent robot control system 100. The methods and the systems of the present disclosure may be intended to build a map according to, for example, information obtained by the intelligent robot control system 100. The obtained information may be captured by a sensor located in the intelligent robot control system 100. The sensor(s) may be optical or magnetoelectric. For example, the sensor may be a camera or a laser radar.

FIG. 1 is a schematic diagram illustrating an intelligent robot control system of a scanning system according to some embodiments of the present disclosure. The intelligent robot control system 100 may include an intelligent robot 110, a network 120, a user device 130, and a database 140. A user may use the user device 130 to control the intelligent robot via the network 120.

The intelligent robot 110 may establish a communication with the user device 130. The communication between the intelligent robot 110 and the user device 130 may be wired or wireless. For example, the intelligent robot 110 may establish the communication with the user device 130 or the database 140 via the network 120, and control the intelligent robot 110 based on an operational command (e.g., a command to move or rotate) from the user device 130 wirelessly. As another example, the intelligent robot 110 may be directly connected to the user device 130 or the database 140 via a cable or a fiber. In some embodiments, the intelligent robot 110 may update or download a map stored in the database 140 based on the communication between the intelligent robot 110 and the database 140. For example, the intelligent robot 110 may capture information in a route and analyze the information to construct a map. In some embodiments, a complete map may be stored in the database 140. In some embodiments, the map constructed by the intelligent robot 110 may include information corresponding to a portion of the complete map. In some embodiments, a corresponding portion of the complete map may be updated based on the constructed map. When the intelligent robot 110 determines its destination and current location, the complete map stored in the database 140 may be accessed by the intelligent robot 110. A portion of the complete map containing the destination and the current location of the intelligent robot 110 may be selected by the intelligent robot 110 for planning the route. In some embodiments, the intelligent robot 110 may plan the route based on the selected map, the destination, and the current location of the intelligent robot 110. In some embodiments, the intelligent robot 110 may use a map of the user device 130. For example, the user device 130 may download a map from the Internet. The user device 130 may direct a movement of the intelligent robot 110 based on the map downloaded from the Internet. As another example, the user device 130 may download a latest map from the database 140. Once the destination and the current location of the intelligent robot 110 are determined, the user device 130 may send the map obtained from the database 140 to the intelligent robot 110. In some embodiments, the user device 130 may be a part of the intelligent robot 110. In some embodiments, if the map built by the intelligent robot 110 includes its destination and current location, the intelligent robot 110 may plan the route based on the map built by itself.

The network 120 may be a single network or a combination of different networks. For example, the network 120 may be a local area network (LAN), a wide area network (WAN), a public network, a private network, a wireless local area network (WLAN), a virtual network, a metropolitan area network (MAN), a public switched telephone network (PSTN), or any combination thereof. For example, the intelligent robot 110 may communicate with the user device 130 and the database 140 via Bluetooth. The network 120 may also include various network access points. For example, a wired or wireless access point, such as a base station or an Internet switching point, may be included in the network 120. The user may send a control operation from the user device 130 to the intelligent robot 110 and receive a result via the network 120. The intelligent robot 110 may access the information stored in the database 140 directly or via the network 120.

The user device 130 connectable to the network 120 may be a mobile device 130-1, a tablet computer 130-2, a laptop computer 130-3, a built-in device 130-4, or the like, or any combination thereof. In some embodiments, the mobile device 130-1 may include a wearable device, an intelligent mobile device, a virtual reality device, an augmented reality device, or the like, or any combination thereof. In some embodiments, the user may control the intelligent robot 110 via a wearable device. The wearable device may include an intelligent bracelet, an intelligent footwear, intelligent glasses, an intelligent helmet, an intelligent watch, an intelligent wear, an intelligent backpack, an intelligent accessory, or the like, or any combination thereof. In some embodiments, the intelligent mobile device may include an intelligent phone, a personal digital assistant (PDA), a gaming device, a navigation device, a point of sale (POS) device, or the like, or any combination thereof. In some embodiments, the virtual reality device and/or the augmented reality device may include a virtual reality helmet, virtual reality glasses, virtual reality eyewear, an augmented reality helmet, augmented reality glasses, augmented reality eyewear, or the like, or any combination thereof. For example, the virtual reality device and/or the augmented reality device may include Google Glass, Oculus Rift, HoloLens, Gear VR, or the like. In some embodiments, the built-in device 130-4 may include a laptop computer, a car TV, or the like. In some embodiments, the user device 130 may be a device having a positioning technique for determining a location of the user and/or the user device 130 related to the user. For example, the route may be determined by the intelligent robot 110 based on the map, the destination, and the current location of the intelligent robot 110. The location of the intelligent robot 110 may be obtained by the user device 130. In some embodiments, the user device 130 may be a device having image capture capabilities. For example, the map stored in the database 140 may be updated based on information captured by an imaging sensor (e.g., a camera). In some embodiments, the user device 130 may be a portion of the intelligent robot 110. For example, a smartphone with a camera, a gyroscope, and an accelerometer may be held by the tripod head of the intelligent robot 110. The user device 130 may be used as a sensor to detect information. As another example, a processor 210 and a storage 220 may be some portions of the smartphone. In some embodiments, the user device 130 may also act as a communication interface for the user of the intelligent robot 110. For example, the user may touch a screen of the user device 130 to select the control operation of the intelligent robot 110.

The database 140 may store the complete map. In some embodiments, a plurality of intelligent robots may be wirelessly connected to the database 140. Each intelligent robot connected to the database 140 may build the map based on the information captured by its sensor. In some embodiments, the map built by the intelligent robot may be a portion of the complete map. During a update process, the constructed map may replace a corresponding region in the complete map. When the route needs to be planned from the location of the intelligent robot 110 to the destination, each intelligent robot may download the map from the database 140. In some embodiments, the map downloaded from the database 140 may be a portion of the complete map that includes at least the location and the destination of the intelligent robot 110. The database 140 may also store historical information related to the user connected to the intelligent robot 110. The historical information may include, for example, a previous operation of the user or information related to how to operate the intelligent robot 110. As shown in FIG. 1, the database 140 may be accessed by the intelligent robot 110 and the user device 130.

It should be noted that the intelligent robot control system 100 is merely intended to describe one example of a particular embodiment of the system and is not intended to limit the scope of the disclosure.

Figure 2:
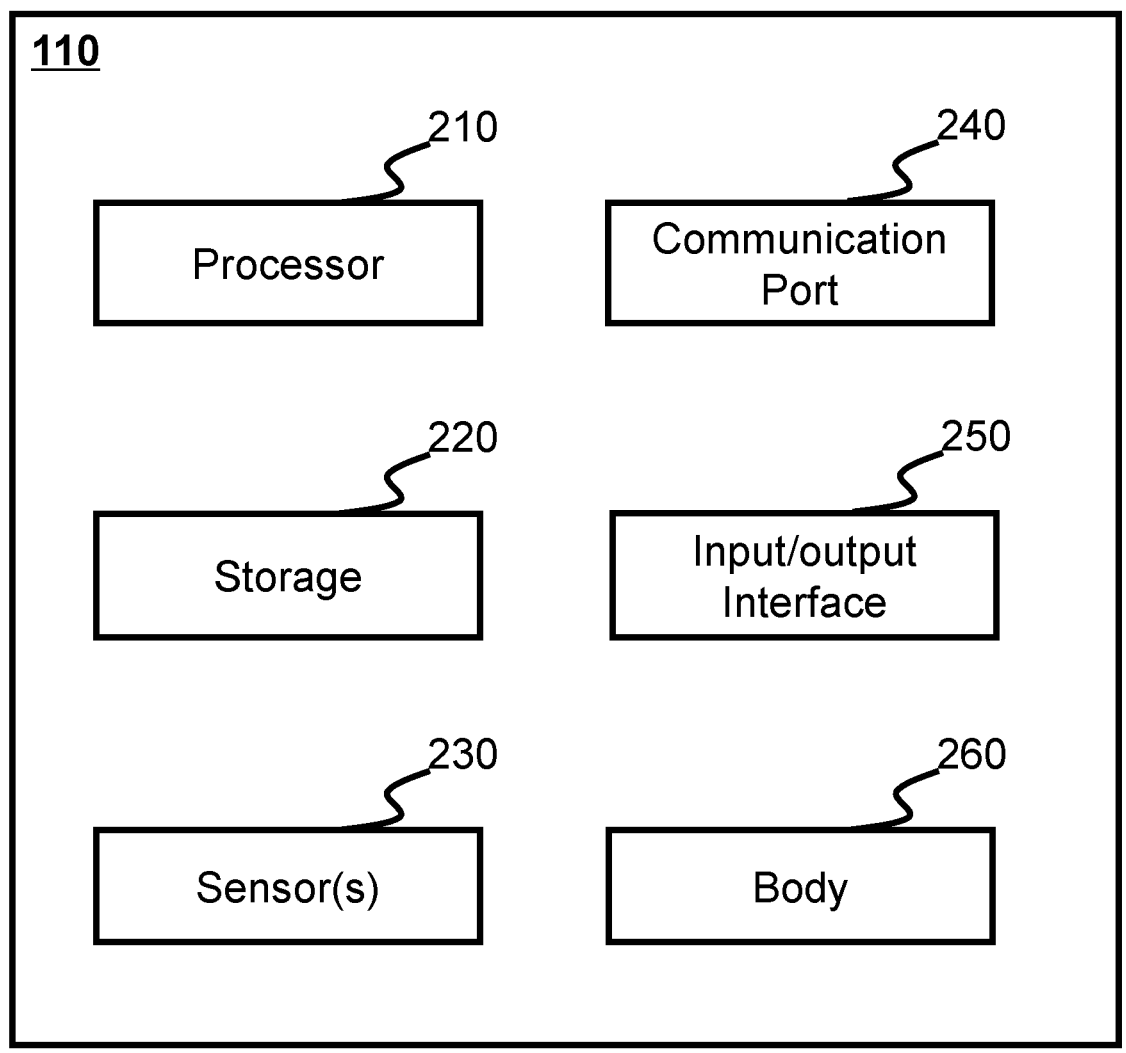
FIG. 2 is a schematic block diagram illustrating a robot in the robot control system of FIG. 1 according to some embodiments of the present disclosure.

FIG. 2 is a schematic block diagram illustrating an intelligent robot 110 in the intelligent robot control system of FIG. 1 according to some embodiments of the present disclosure. The intelligent robot 110 may include a processor 210, a storage 220, a sensor(s) 230, a communication port 240, an input/output interface 250, and a body 260. The sensor(s) 230 may obtain information. In some embodiments, the information may include image data, gyroscope data, accelerometer data, position data, and distance data. The processor 210 may process the information to generate one or more results. In some embodiments, the one or more results may include displacement information and depth information (e.g., the displacement of a camera between two adjacent frames and the depth of an object in two adjacent frames). In some embodiments, the processor 210 may construct a map based on the one or more results. The processor 210 may also transfer the map to the database 140 for update. In some embodiments, the processor 210 may include one or more processors (e.g., a single core processor or a multi-core processor). For example, the processor 210 may include a central processing unit (CPU), an application specific integrated circuit (ASIC), a dedicated instruction set processor (ASIP), a graphics processing unit (GPU), a physical processing unit (PPU), a digital signal processor (DSP), a field programmable gate array (FPGA), a programmable logic device (PLD), a controller, a microcontroller unit, a reduced instruction set computer, a microprocessor, or the like, or any combination thereof. As another example, the processor 210 may be a specially designed processing component or device with a special function.

The storage 220 may store instructions for the processor 210. When executing the instructions, the processor 210 may perform one or more functions or operations described in the present disclosure. For example, the storage 220 may store instructions that may be executed by the processor 210 to process the information obtained by the sensor(s) 230. In some embodiments, the processor 220 may automatically store the information obtained by the sensor(s) 230. The storage 220 may also store the one or more results generated by the processor 210 (e.g., the displacement information and/or the depth information used to construct the map). For example, the processor 210 may generate the one or more results and store them in the storage 220. The one or more results may be read by the processor 210 from the storage 220 to construct the map. In some embodiments, the storage 220 may store the map constructed by the processor 210. In some embodiments, the storage 220 may store the map obtained by the processor 210 from the database 140 or the user device 130. For example, the storage 220 may store the map constructed by the processor 210. The constructed map may be transmitted to the database 140 to update the corresponding portion of the complete map. As another example, the storage 220 may temporarily store the map downloaded by the processor 210 from the database 140 or the user device 130. In some embodiments, the storage 220 may include a mass storage, a removable storage, a volatile read/write storage, a read-only storage (ROM), or the like, or any combination thereof. The exemplary mass storage may include a disk, an optical disk, s solid-state drive, or the like. The exemplary removable storage may include a flash drive, a floppy disk, an optical disk, a memory card, a zip disk, a magnetic tape, or the like. The exemplary volatile read/write storage may include a random-access storage (RAM). The exemplary RAM may include a dynamic RAM (DRAM), a dual date rate synchronous dynamic RAM (DDR SDRAM), a static RAM (SRAM), a thyristor RAM (T-RAM), a zero capacitor RAM (Z-RAM), or the like. The exemplary ROM may include a mask ROM (MROM), a programmable ROM (PROM), an erasable programmable ROM (EPROM), an electrically erasable programmable ROM (EEPROM), a compact disk ROM (CD-ROM) digital multifunction disk ROM.

The sensor(s) 230 may obtain image data of an object or an obstacle, gyroscope data, accelerometer data, position data, distance data, and any other data that may be used by the intelligent robot 110 to perform the various functions described in this disclosure. For example, the sensor(s) 230 may include one or more night-vision cameras for obtaining the image data in low light environments. In some embodiments, the data and/or the information obtained by the sensor(s) 230 may be stored in the storage 220 and may be processed by the processor 210. In some embodiments, the one or more sensor(s) 230 may be installed in the body 260. More specifically, for example, one or more imaging sensors may be installed in the tripod head of the body 260. One or more navigation sensors, a gyroscope, and an accelerometer may be installed in the tripod head and a motion module. In some embodiments, the sensor(s) 230 may automatically explore the environment and detect the location under the control of the processor 210. For example, the sensor(s) 230 may be used to dynamically sense or detect the location of the object, the obstacle, or the like.

The communication port 240 may be a communication port for communicating within the intelligent robot 110. That is, the communication port 240 may exchange information between components of the intelligent robot 110. In some embodiments, the communication port 240 may send signals/data/signals from the processor 210 to an internal portion of the intelligent robot 110, and receive signals from the internal portion of the intelligent robot 110. For example, the processor 210 may receive information from the sensor installed in the body 260. As another example, the processor 210 may send a control operation to the body 260 via the communication port 240. The send-receive process may be implemented via the communication port 240. The communication port 240 may receive various wireless signals in accordance with certain wireless communication specifications. In some embodiments, the communication port 240 may be provided as a communication module for known wireless local area communications such as Wi-Fi, Bluetooth, infrared (IR), ultra-wideband (UWB), ZigBee, or the like, as a mobile communication module such as 3G, 4G, or Long Term Evolution (LTE), or as a known communication method for a wired communication. In some embodiments, the communication port 240 may not limited to an element for sending/receiving signals from an internal device and may be used as an interface for interactive communications. For example, the communication port 240 may establish the communication between the processor 210 and other components of the intelligent robot 110 via a circuit of an application program interface (API). In some embodiments, the user device 130 may be a portion of the intelligent robot 110. In some embodiments, the communication between the processor 210 and the user device 130 may be performed by the communication port 240.

The input/output interface 250 may be an interface for communications between the intelligent robot 110 and other external devices such as the database 140. In some embodiments, the input/output interface 250 may control data transmissions with the intelligent robot 110. For example, the latest map may be transmitted from the database 140 to the intelligent robot 110. As another example, the map constructed based on the information obtained by the sensor(s) 230 may be transmitted from the database 140 to the intelligent robot 110. The input/output interface 250 may also include various additional components, such as a wireless communication module (not shown) for a wireless communication or a tuner (not shown) for adjusting broadcast signals, which may depend on a type of design of the intelligent robot 110 and the components used for receiving signals/data from outside. The input/output interface 250 may be used for the communication module of the known wireless local area communications, such as the Wi-Fi, the Bluetooth, the infrared (IR), the ultra-wideband (UWB), the ZigBee, or the like, as the mobile communication module such as the 3G, the 4G or the Long Term Evolution (LTE), or as a known input/output interface for the wired communication. In some embodiments, the input/output interface 250 may be provided as the communication module for a known wired communication, such as an optical fiber or a Universal Serial Bus (USB). For example, the intelligent robot 110 may exchange data with the database 140 of a computer via a USB interface.

The body 260 may be a body for holding the processor 210, the storage 220, the sensor 230, the communication port 240, and the input/output interface 250. The body 260 may execute instructions from the processor 210 to move and rotate the sensor(s) 230 to obtain or detect the information of a region. In some embodiments, the body 260 may include the motion module and the tripod head, as described elsewhere in the present disclosure (e.g., FIG. 9 and descriptions thereof). In some embodiments, sensor(s) may be installed in the motion module and the tripod head, respectively.

Figure 3:
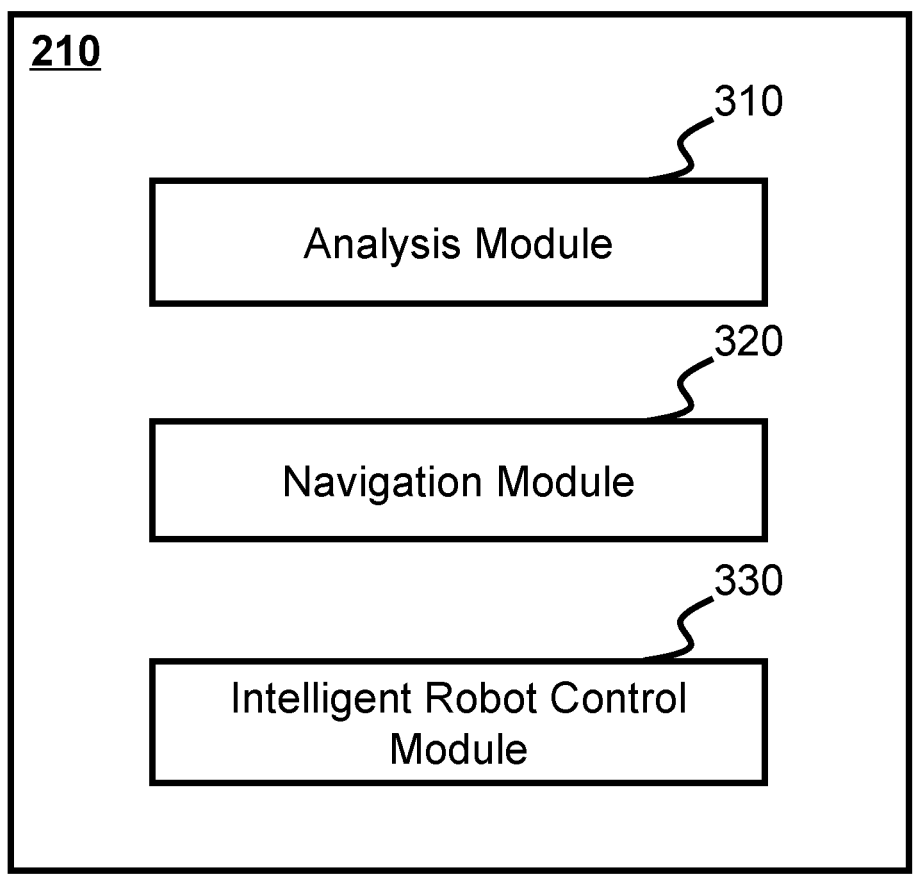
FIG. 3 is a schematic block diagram illustrating a processor in the robot of FIG. 2 according to some embodiments of the present disclosure.

FIG. 3 is a schematic block diagram illustrating a processor 210 according to some embodiments of the present disclosure. As shown in FIG. 3, the processor 210 may include an analysis module 310, a navigation module 320, and an intelligent robot control module 330.

The analysis module 310 may analyze the information obtained from the sensor(s) 230 and generate one or more results. The analysis module 310 may construct the map based on the one or more results. In some embodiments, the constructed map may be sent to the database 140. In some embodiments, the analysis module 310 may receive the latest map from the database 140 and send it to the navigation module 320. The navigation module 320 may plan the route from the location of the intelligent robot 110 to the destination. In some embodiments, the complete map may be stored in the database 140. The map constructed by the analysis module 310 may correspond to a portion of the complete map. The update process may include replacing the corresponding portion of the complete map with the constructed map. In some embodiments, the map constructed by the analysis module 310 may be up to date and may include the location and the destination of the intelligent robot 110. The analysis module 310 may not receive the map from the database 140. The map constructed by the analysis module 310 may be transmitted to the navigation module 320 to plan the route. The intelligent robot control module 330 may generate the control parameter of the intelligent robot 110 based on the route planned by the navigation module 320. In some embodiments, the control parameter may be temporarily stored in the storage 220. In some embodiments, the control parameter may be sent to the intelligent robot body 260 to control the movement of the intelligent robot 110. More descriptions of the control parameter may be found elsewhere in the present disclosure (e.g., FIG. 6, FIG. 7, and descriptions thereof).

Figure 4:
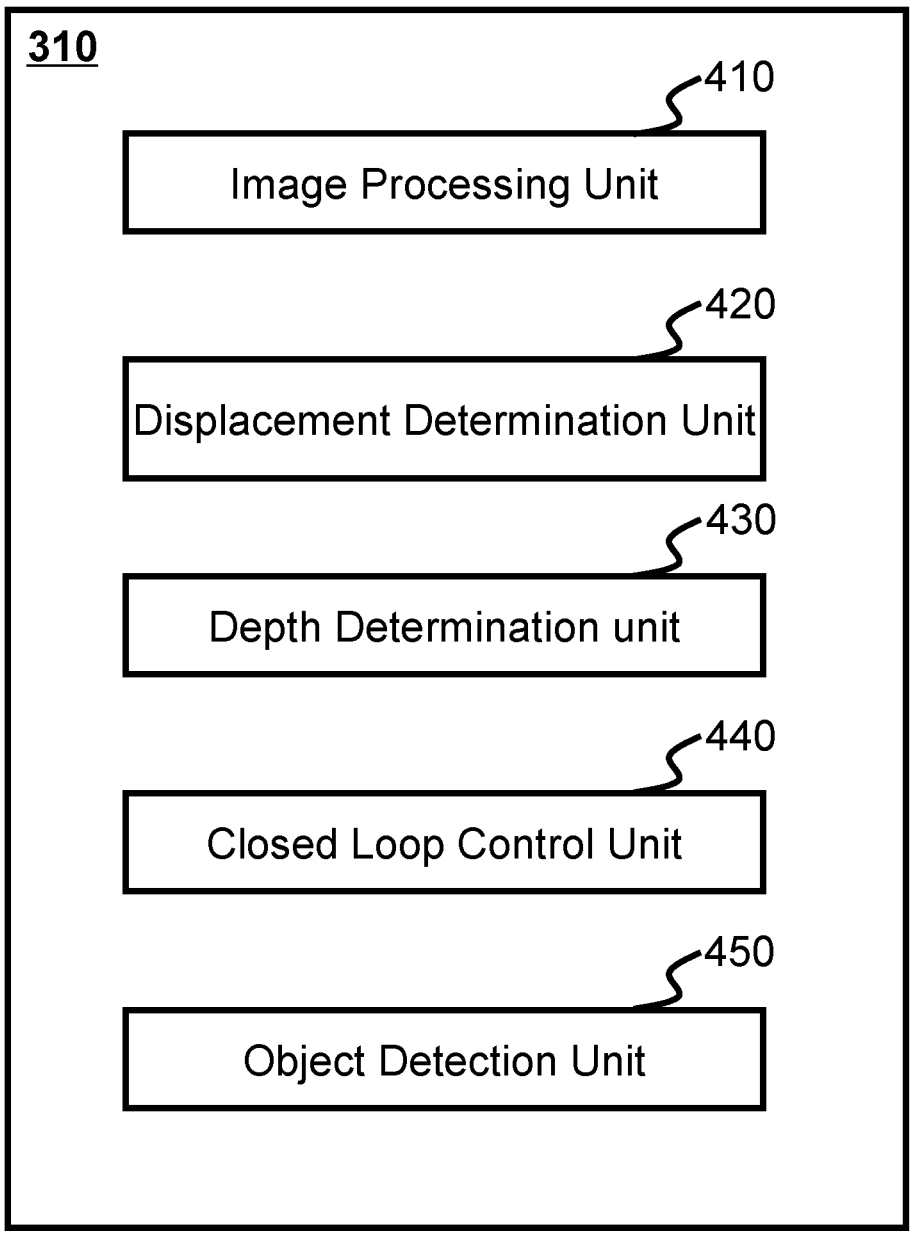
FIG. 4 is a schematic block diagram illustrating an analysis module in the processor of FIG. 3 according to some embodiments of the present disclosure.

FIG. 4 is a schematic block diagram illustrating an analysis module in the processor 210 of FIG. 3 according to some embodiments of the present disclosure. In some embodiments, the analysis module 310 may include an image processing unit 410, a displacement determination unit 420, a depth determination unit 430, a closed loop control unit 440, and an object detection unit 450.

The image processing unit 410 may process image data to perform the one or more functions of the intelligent robot 110. The image data may include, for example, one or more images (e.g., a still image, a video frame, etc.), an initial depth and displacement of each pixel point in each frame, and/or any other data related to the one or more images. In some embodiments, the displacement may include the displacement of a wheel between time intervals in which two adjacent frames are taken and the displacement of the camera relative to the wheel. The image data may be provided by any device capable of providing the image data, such as the sensor(s) 230 (e.g., one or more imaging sensors). In some embodiments, the image data may include data of a plurality of images. The image may include a video frame sequence (also referred to as a "frame"). Each of the frame may be a frame, a numeric field, or the like.

In some embodiments, the image processing unit 410 may process the image data to generate motion information of the intelligent robot 110. For example, the image processing unit 410 may process two frames (e.g., a first frame and a second frame) to determine a difference between the two frames. The image processing unit 410 may then generate the motion information of the intelligent robot 110 based on the difference between the frames. In some embodiments, the first frame and the second frame may be adjacent frames (e.g., a current frame and a previous frame, a current frame and a subsequent frame, etc.). In addition, the first frame and the second frame may also be non-adjacent frames. More specifically, for example, the image processing unit 410 may determine one or more corresponding pixel points in the first frame and the second frame and one or more regions including the corresponding pixel points (also referred to as "overlapping regions"). In response to a determination that the first pixel point and the second pixel point are correspond a same object, the image processing unit 410 may determine the first pixel point in the first frame as the corresponding pixel point of the second pixel point in the second frame. The first pixel point in the second frame and its corresponding pixel point (e.g., the second pixel point) may correspond to a same location of the object. In some embodiments, the image processing unit 410 may identify one or more pixel points in the first frame that do not have corresponding pixel points in the second frame. The image processing unit 410 may further identify one or more regions (also referred to as "non-overlapping regions") including the identified pixel points. The non-overlapping regions may correspond to the motion of the sensor(s) 230. In some embodiments, the pixel points of the non-overlapping regions in the first frame having no corresponding pixel points in the second frame may be omitted in further processing (e.g., by the processing of the displacement determination unit 420 and/or the depth determination unit 430).

In some embodiments, the image processing unit 410 may identify an intensity of the pixel points in the first frame and the corresponding pixel points in the second frame. In some embodiments, the intensity of the pixel points in the first frame and the corresponding pixel points in the second frame may be obtained as a criterion for determining the difference between the first frame and the second frame. For example, the intensity of red, green, blue (RGB) may be selected as the criterion for determining the difference between the first frame and the second frame. The pixel points, the corresponding pixel points, and the intensity of the RGB may be sent to the displacement determination unit 420 and/or the depth determination unit 430 for determining the displacement and the depth of the second frame. In some embodiments, the depth may represent a spatial depth of the object in the two frames. In some embodiments, the displacement information may be a set of displacements of a set of frames. In some embodiments, the depth information may be depths of the set of frames. The frames, the displacement information, and the depth information may be used to construct the map.

The displacement determination unit 420 may determine the displacement information based on the data provided by the image processing unit 410 and/or any other data. The displacement information may include one or more displacements that may represent the motion information of the sensor(s) 230 that generates the image data (e.g., an image sensor used for capturing a plurality of frames). For example, the displacement determination unit 420 may obtain the data of the corresponding pixel points in the two frames (e.g., the first frame and the second frame). The data may include one or more values of the pixel point, such as a gray value, the intensity, or the like. The displacement determination unit 420 may determine the values of the pixel points according to any suitable color model (e.g., a RGB model, a hue, saturation, and brightness (HSV) model, etc.). In some embodiments, the displacement determination unit 420 may determine the difference between the corresponding pairs of pixel points in the two frames. For example, the image processing unit 410 may identify the first pixel point in the first frame and its corresponding pixel point (e.g., the second pixel point) in the second frame, and determine the second pixel point according to a transformation of the coordinates of the first pixel point. The first pixel point and the second pixel point may correspond to the same object. The displacement determination unit 420 may also determine the difference between the value of the first pixel point and the value of the second pixel point. In some embodiments, the displacement may be determined by minimizing a sum of the differences between the corresponding pairs of pixel points in the first frame and the second frame.

In some embodiments, the displacement determination unit 420 may determine an initial displacement $\xi_{ji,1}$, representing an origin estimated value of the displacement. For example, the initial displacement $\xi_{ji,1}$ may be determined according to the following Equation (1):

$$\xi_{ji,1} = \underset{\xi_{ji}}{\operatorname{argmin}} \int_{\Omega} |I_i(x) - I_j(\omega(x, D_i(x), \xi_{ji}))|_\delta dx, \qquad (1)$$

wherein, x represents the coordinates of the pixel points in the first frame;
$\omega(x,D_i(x),\xi_{ji})$ represents the coordinates of the corresponding pixel points in the second frame, and $\omega(x,D_i(x),\xi_{ji})$ and $I_i(x)$ may be at the same relative position of an object; and $\omega(x,D_i(x),\xi_{ji})$ represents the transformed pixel point of the x after the camera moves a certain displacement $\xi_{ji}$. $\Omega$ may be a set of pixel point pairs. Each pixel point pair may include a pixel point in the first frame and a corresponding pixel point in the second frame. $I_i(x)$ represents the intensity of the RGB of the pixel point whose coordinate value is x; $I_i(\omega(x,D_i(x),\xi_{ji}))$ represents the intensity of the RGB of the pixel point $\omega(x,D_i(x),\xi_{ji})$.

$\omega(x,D_i(x),\xi_{ji})$ may be the transformation coordinate of x after the camera moves a certain displacement $\xi_{ji}$. In some embodiments, the displacement determination unit 420 may determine the corresponding pixel point $\omega(x,D_i(x),\xi_{ji})$ based on the initial value of the displacement and the initial depth $D_i(x)$. In some embodiments, the initial depth $D_i(x)$ may be a zero matrix. The initial value of the displacement $\xi_{ji}$ may be a variable. In order to obtain the initial displacement $\xi_{ji}$, the displacement determination unit 420 may need the initial value $\xi_{ji}$ of the displacement as shown in the iteration Equation (1). In some embodiments, the initial value of the displacement $\xi_{ji}$ may be determined based on the displacement of the wheel $\xi_{ji}'$ and the displacement of the camera relative to the wheel $\xi_{ji}'$. More descriptions of the initial value $\xi_{ji}'$ may be found elsewhere in the present disclosure (e.g., FIG. 17A, and descriptions thereof). In some embodiments, the initial value of the displacement may be a sum of vector $\xi_{ji}'$ and vector $\xi_{ji}''$. Try to get around the initial value of the displacement $\xi_{ji}$ initial value and variable, the minimum difference between the two frames may be obtained.

In some embodiments, the depth determination unit 430 may determine the updated depth $D_{i,1}(x)$. The updated depth $D_{i,1}(x)$ may be determined according to Equation (2):

$$D_{i,1}(x) = \underset{D_i(x)}{\operatorname{argmin}} \int_{\Omega} |I_i(x) - I_j(\omega(x, D_i(x), \xi_{ji,1}))|_\delta dx, \qquad (2)$$

wherein the depth $D_i(x)$ represents the variable of the difference between the two frames in the Equation (2). When the difference between the two frames is the smallest, the value $D_{i,1}(x)$ may be determined as the updated depth. In some embodiments, the initial depth $D_i(x)$ may be a zero matrix.

The displacement determination unit 420 may also generate an updated displacement $\xi_{ji,1u}$ based on the updated depth $D_{i,1}(x)$. In some embodiments, the updated displacement $\xi_{ji,1u}$ may be obtained by replacing the initial depth $D_i(x)$ with the updated depth $D_{i,1}(x)$ according to the Equation (1).

The closed loop control unit 440 may perform a closed loop detection. The closed loop control unit 440 may detect whether the intelligent robot 110 returns to the previously visited location and update the displacement information based on the detection result. In some embodiments, in response to a determination that the intelligent robot 110 has returned to the previously visited location in the route, the closed loop control unit 440 may adjust the updated displacement of the frame to reduce an error by using a g2o closed loop detection. The g2o closed loop detection may be a general optimization framework for reducing the nonlinear error. The adjusted updated displacement of the frame may be set as the displacement information. In some embodiments, if the intelligent robot 110 includes a depth sensor such as a laser radar, the depth may be obtained directly. The displacement may be determined according to the Equation (1). The adjusted displacement may be generated by adjusting the displacement by the closed loop control unit 440.

First, when the depth sensor detects the depth information, the displacement information may be a set of displacements according to the Equation (1). The displacement information may be adjusted by the closed loop control unit 440. When the depth information is a set of updated depths, the displacement information may be a set of displacements adjusted according to the Equation (1), the Equation (2), and by the closed loop control unit 440.

In some embodiments, the closed loop control unit 440 may generate the map according to the frames, the displacements, and the depth information.

The analysis module 310 may also include the object detection unit 450. The object detection unit 450 may detect obstacles, objects, and distances from the intelligent robot 110 to the obstacles and the objects. In some embodiments, the obstacles and the objects may be detected based on the data obtained by the sensor(s) 230. For example, the object detection unit 450 may detect the object based on distance data captured by a sonar, an infrared distance sensor, an optical flow sensor, or a laser radar.

Figure 5:
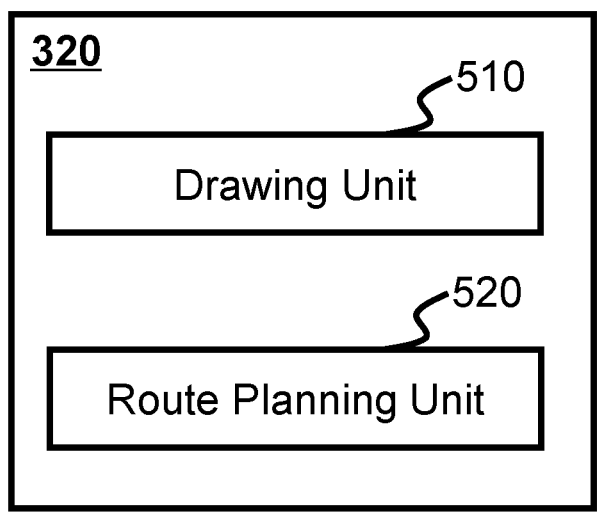
FIG. 5 is a schematic block diagram illustrating a navigation module in a processor according to some embodiments of the present disclosure.

FIG. 5 is a schematic block diagram illustrating an exemplary navigation module 320 in the processor 210 according to some embodiments of the present disclosure. In some embodiments, the navigation module 320 may include a drawing unit 510 and a route planning unit 520. In some embodiments, the drawing unit 510 may obtain a map from the database 140. In some embodiments, the drawing unit 510 may process the map for route planning. In some embodiments, the map may be a portion of a complete map in the database 140. For example, the map containing a determined destination and a location of the intelligent robot 110 may be suitable for planning a route. In some embodiments, the map obtained from the database 140 may be a 3D map. In some embodiments, the drawing unit 510 may convert the 3D map into a 2D map by a projection technique. That is, the drawing unit 510 may divide an object in the 3D map into pixel points and project the pixel points onto a horizontal surface to generate the 2D map. Once the 2D map is obtained by the drawing unit 510, the route planning unit 520 may plan the route from the location of the intelligent robot 110 to the destination based on the transmitted 2D map.

The intelligent robot control module 330 may determine a control parameter according to the route planned by the route planning unit 520 in the navigation module 320. In some embodiments, the intelligent robot control module 330 may divide the route into a group of segments. The intelligent robot control module 330 may obtain a set of nodes for the segments. In some embodiments, the node between the two segments may be an end point of a previous segment and a starting point of a latter segment. The control parameter of the segment may be determined based on the start point and the end point of the segment.

In some embodiments, during the movement of the intelligent robot 110 in the segment, an end point of the intelligent robot 110 may not match the predetermined end point of the segment. The route planning unit 520 may plan a new route according to the mismatched end point (the new location of the intelligent robot 110) and the destination. In some embodiments, the intelligent robot control module 330 may divide the new route and generate one or more new segments. The intelligent robot control module 330 may then determine a set of control parameters for each new segment.

Figure 6:
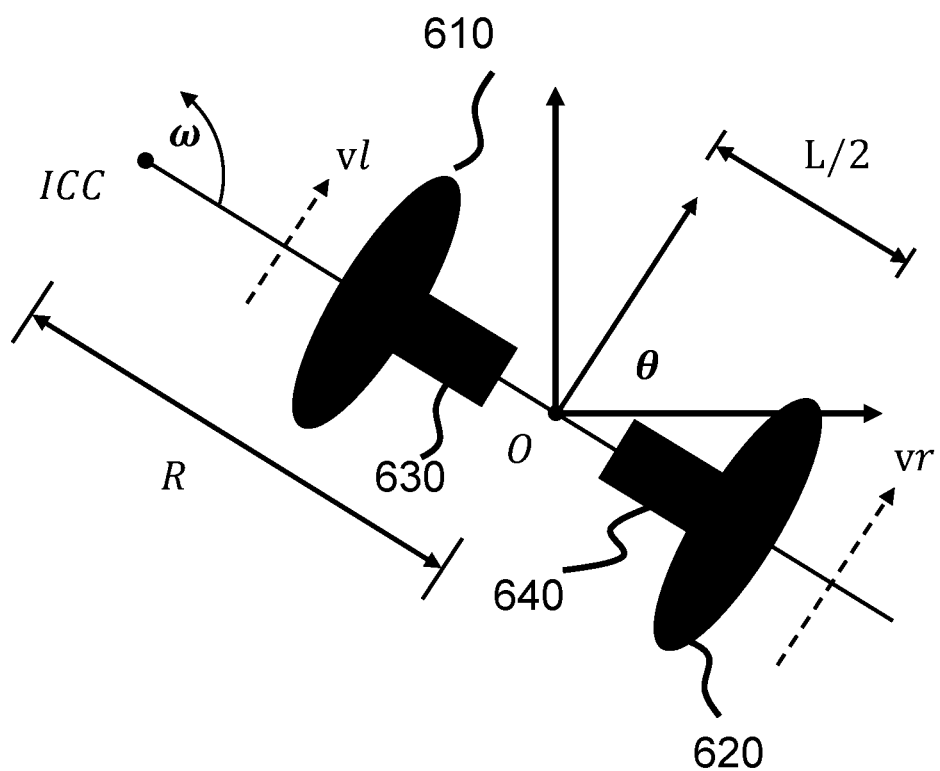
FIG. 6 is a schematic diagram illustrating a motion control according to some embodiments of the present disclosure.
Figure 7:
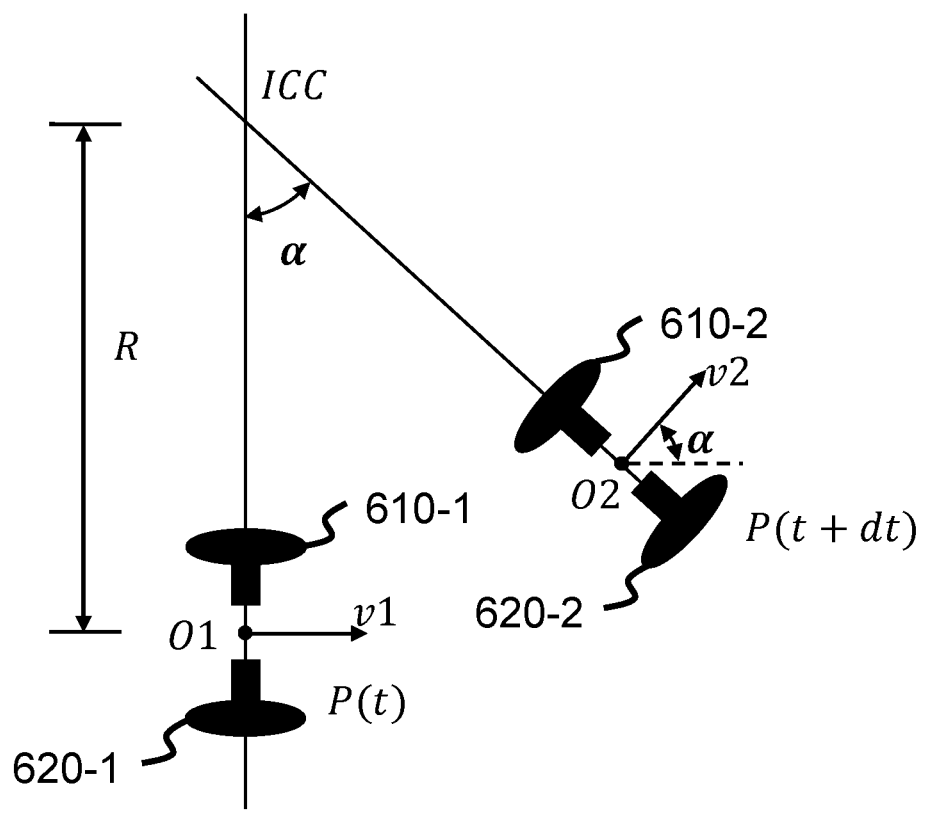
FIG. 7 is a schematic diagram illustrating a motion control according to some embodiments of the present disclosure.

FIG. 6 and FIG. 7 are schematic diagrams illustrating exemplary motion controls of the intelligent robot 110. As shown in FIG. 6, a motion module may move around a point ICC at an angular velocity ω. The motion module may have two wheels. A left wheel 610 may move at a speed $v_l$ and a right wheel 620 may move at a speed $v_r$. In some embodiments, a distance between the left wheel 610 and the right wheel 620 may be L. A distance between the left wheel 610 and a center point O, and a distance between the right wheel 620 and the center point O may be both L/2. A distance between the center point O and the point ICC may be R.

FIG. 7 is a schematic diagram illustrating an exemplary process for determining a control parameter of the intelligent robot 110. As shown in FIG. 7, the motion module of the intelligent robot 110 may move from a point $O_1$ to a point $O_2$ within dt. An included angle between a line connecting the point $O_1$ and the point ICC, and a line connecting the point $O_2$ and the point ICC may be α. If dt, L, R, and α are known, a speed of the left wheel $v_l$ and a speed of the right wheel $v_r$ may be determined.

Figure 8:
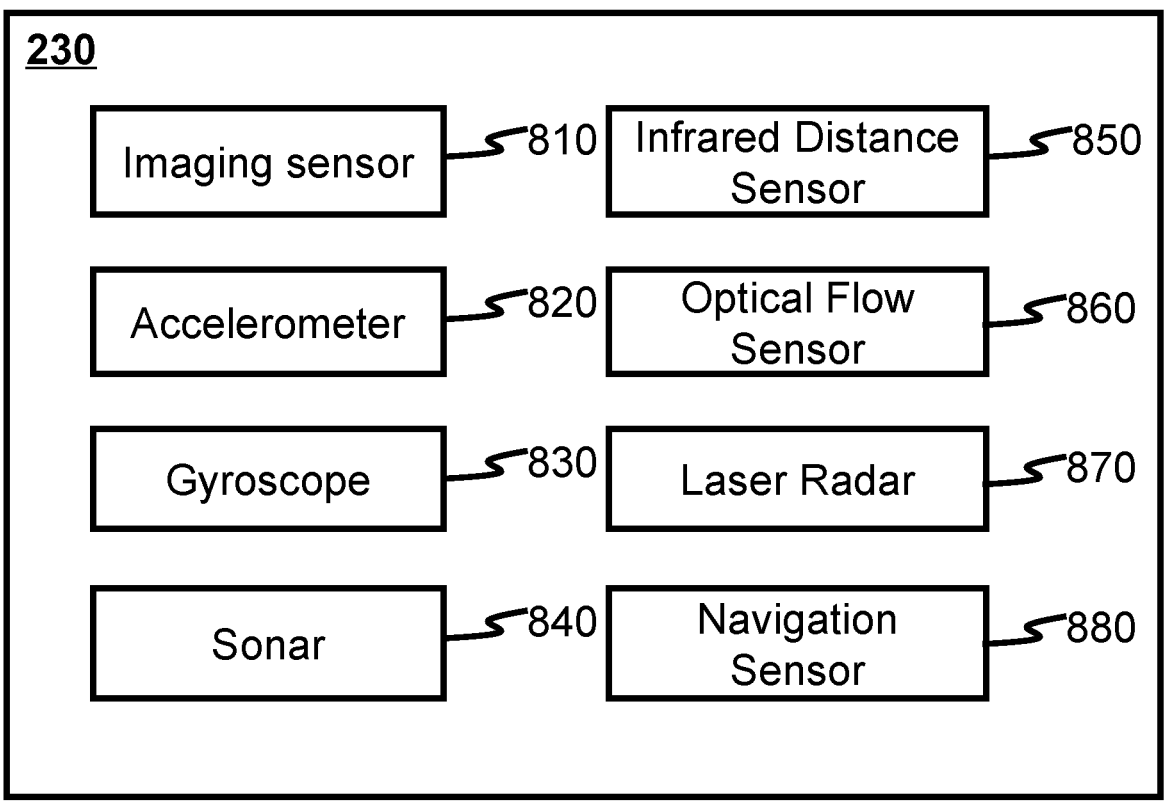
FIG. 8 is a schematic diagram illustrating a structure of a sensor in FIG. 2 according to some embodiments of the present disclosure.

FIG. 8 is a schematic diagram illustrating the structure of the sensor(s) 230 according to some embodiments of the present disclosure. The sensor(s) 230 may include an imaging sensor 810, an accelerometer 820, a gyroscope 830, a sonar 840, an infrared distance sensor 850, an optical flow sensor 860, a laser radar 870, and a navigation sensor 880.

The imaging sensor 810 may capture image data. In some embodiments, the analysis module 310 may construct a map based on the image data. In some embodiments, the image data may include a frame, an initial depth and a displacement of each pixel point of each frame. In some embodiments, the initial depth and the displacement may be used to determine a depth and a displacement. More descriptions for obtaining the depth and the displacement may be found elsewhere in the present disclosure (e.g., Equation (1) in FIG. 4, and descriptions thereof). In some embodiments, the displacement may include a displacement of the wheel and a displacement of the camera relative to the wheel during a time interval in which two adjacent frames are taken.

In order to maintain a balance between the motion module and the tripod head, the accelerometer 820 and the gyroscope 830 may operate together. In order to obtain stable information from the sensor(s) 230, the balance is necessary. In some embodiments, in order to control a pitch attitude within a certain threshold, the accelerometer 820 and the gyroscope 830 may operate together. In some embodiments, the accelerometer 820 and the gyroscope 830 may be held by the motion module and the tripod head, respectively. More descriptions of the balance may be found elsewhere in the present disclosure (e.g., FIG. 18, FIG. 19, and descriptions thereof).

The sonar 840, the infrared distance sensor 850, and the optical flow sensor 860 may determine the location of the intelligent robot 110. In some embodiments, the intelligent robot 110 may be positioned by the sonar 840, the infrared distance sensor 850, the optical flow sensor 860, or the like, or any combination thereof.

The laser radar 870 may detect the depth of the object in the frame. That is, the laser radar 870 may obtain the depth of each frame. The analysis module 310 in the processor 210 may not need to determine the depth. The depth obtained by the laser radar 870 may be directly used to determine the displacement described in Equation (1) in FIG. 4. The displacement determined according to Equation (1) may be adjusted by the closed loop control unit 440.

The intelligent robot 110 may be positioned by the sonar 840, the infrared distance sensor 850, and the optical flow sensor 860 by detecting the distance between the intelligent robot 110 and the object or the obstacle. The navigation sensor 880 may determine the location of the intelligent robot within a rough range of region or locations. In some embodiments, the navigation sensor 880 may determine the location of the intelligent robot 110 with any type of positioning system. The positioning system may include a Global Positioning System (GPS), a Beidou navigation or positioning system, and a Galileo positioning system.

Figure 9:
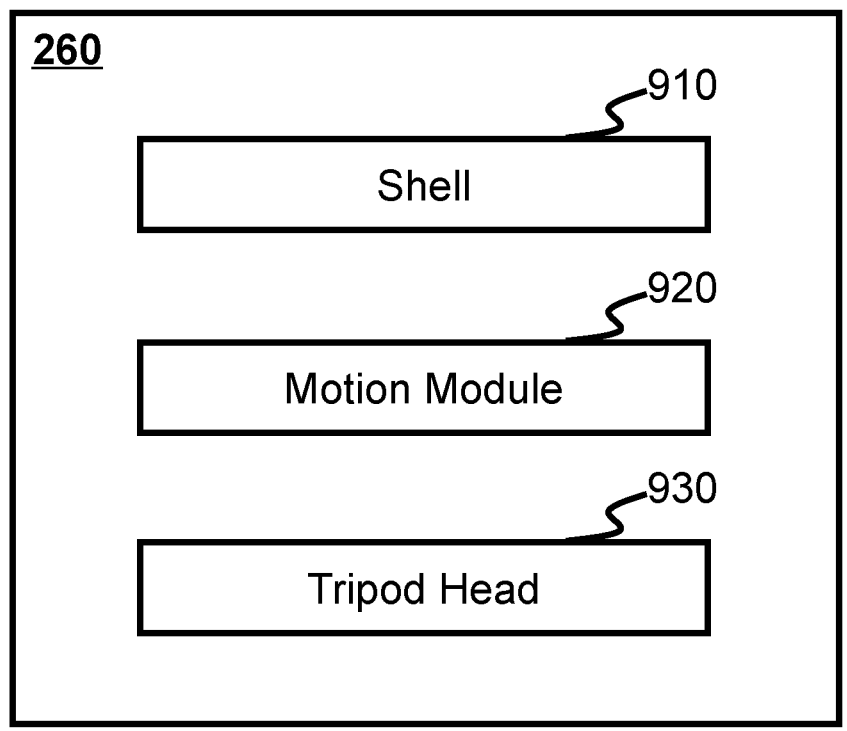
FIG. 9 is a schematic diagram illustrating a body in FIG. 2 according to some embodiments of the present disclosure.

FIG. 9 is an exemplary block diagram of the body 260 in FIG. 2 according to some embodiments of the present disclosure. The body 260 may include a shell 910, a motion module 920, and a tripod head 930. The shell 910 may be a shell of the body 260. The shell of the body 260 may protect the modules and the units of the intelligent robot 110. The motion module 920 may be a motion operating component in the intelligent robot 110. In some embodiments, the motion module 920 may move based on a control parameter generated by the intelligent robot control module 330 in the processor 210. For example, in a segment of a route determined by the intelligent robot control module 330, the control parameter may be determined based on a start point and an end point of the segment of the route. Then, in order for the intelligent robot 110 to move from the start point to the end point, the control parameter may be transmitted from the intelligent robot control module 330 to the motion module 920. In some embodiments, the tripod head 930 may be at least one support device for the sensor described in FIG. 8. The tripod head 930 may support the imaging sensor 810, such as a camera, to obtain a frame. In some embodiments, the tripod head may support the imaging sensor 810, such as a camera, to capture the frame. In some embodiments, the tripod head 930 may support the accelerometer 820 and the gyroscope 830 to achieve the stable information by maintaining the balance of the sensor supported by the tripod head. In order to detect a distance between the intelligent robot 110 and the object or the obstacle, the tripod head 930 may support at least one of the sonar 840, the infrared distance sensor 850, and the optical flow sensor 860. In order to detect the depth information or other information, the tripod head 930 may also support the laser radar 870 and other sensors. In some embodiments, the navigation sensor 880 may be installed on the tripod head 930. In some embodiments, the sensor supported by the tripod head may be integrated in a smartphone.

Figure 10:
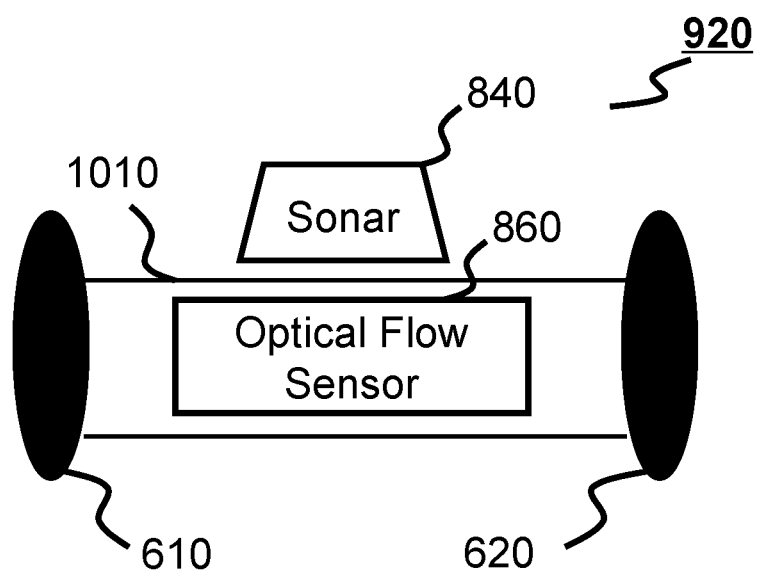
FIG. 10 is a schematic diagram illustrating a motion module according to some embodiments to the present disclosure.

In some embodiments, the driving portion of the robot on the intelligent wheelchair may include one or more drive motors and one or more wheels. A mechanical transmission structure of the intelligent wheelchair may combine the one or more drive motors with the one or more wheels. FIG. 10 is a schematic diagram of the motion module 920. The motion module 920 may include a motion unit and a carrier 1010. The motion unit may include two wheels. The two wheels may include the left wheel 610 and the right wheel 620. The carrier 1010 may carry the sonar 840 or the optical flow sensor 860 to detect an object or an obstacle. In some embodiments, the carrier 1010 may include the accelerometer 820 (not shown in FIG. 10) and the gyroscope 830 (not shown in FIG. 10) to maintain the balance of the motion module 920. In some embodiments, the carrier 1010 may include other sensors, for example, the infrared distance sensor 850, to obtain other required information.

In some embodiments, the left wheel 610 and the right wheel 620 may include at least one of a swivel caster or a wheel having a certain limit of a rotation angle. An intelligent wheelchair control system may be installed on the body or the frame. The intelligent control system of the intelligent wheelchair may generate a control signal. The motor may drive at least one of the left wheel 610 or the right wheel 620 to perform various simple or complex motions based on the control signal. The movement may include moving forward, moving backward, uphill, downhill, going up stairs, going down stairs, or the like. In some embodiments, at least one of the left wheel 610 and the right wheel 620 may be combined with a track to travel on a flat road. In some embodiments, at least one of the left wheel 610 and the right wheel 620 may be stepped while fixed (not rotating). In this situation, the fixed wheel may be a leg of the intelligent wheelchair. The left wheel 610 and the right wheel 620 may implement multi-functions and complex road walking based on the combination of the above various modes and the structural design of the wheel.

There are many combinations of the mechanical transmission structures of the intelligent wheelchairs. In some embodiments, the wheels of the intelligent wheelchair (the left wheel 610 and the right wheel 620) may be configured with at least one drive motor. In some embodiments, the left wheel 610 and the right wheel 620 of the intelligent wheelchair may be configured with a plurality of drive motors. In some embodiments, the left wheel 610 and the right wheel 620 of the intelligent wheelchair may be configured with a same drive motor. The intelligent wheelchair may also include the intelligent control system. The intelligent control system may generate a control command. The one or more drive motors may drive the left wheel 610 and/or the right wheel 620 based on the control command. In some embodiments, the drive motor may include but is not limited to a direct current motor and an alternating current motor. The direct current motor may include but is not limited to a brushless direct current motor and a brushed direct current motor. The brushed direct current motor may include but is not limited to a permanent magnet direct current motor and an electromagnetic direct current motor. The permanent magnet direct current motor may include but is not limited to a rare earth permanent magnet direct current motor, a ferrite permanent magnet direct current motor, an alnico permanent magnet direct current motor, or the like. The electromagnetic direct current motor may include but is not limited to a series-excited direct current motor, a shunt-coupled direct current motor, a separately-excited direct current motor, a compound-excited direct current motors, or the like. The alternating current motor may include but is not limited to a single-phase motor, a three-phase motor, or the like.

In some embodiments, the left wheel 610 and/or the right wheel 620 of the intelligent wheelchair and the drive motor may be connected by a hub connection or a pivot connection. The hub connection may include but is not limited to a key connection, a spline connection, an interference fit connection, a pin connection, an expansion sleeve connection, a molded connection, etc. The key connection may include a flat key connection, a semi-circular key connection, a wedge key connection, a tangential key connection, etc. The spline connection may include a rectangular spline, an involute spline, etc. The manufacturing method of the pivot may include the use of a sliding bearing, a ball bearing, a roller bearing, a needle bearing, an elastic joint, or the like.

Figure 11:
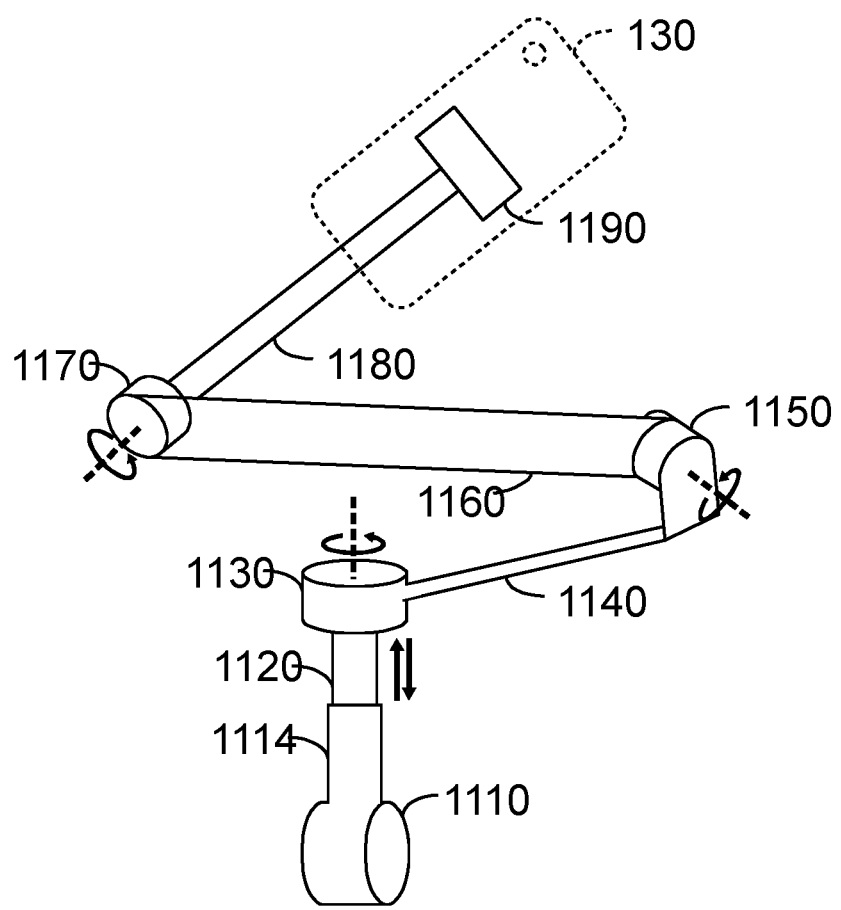
FIG. 11 is a schematic diagram illustrating a structure of a tripod head in FIG. 9 according to some embodiments of the present disclosure.

As shown in FIG. 9, the tripod head 930 may support the sensor(s) 230 to obtain the information to generate the map, plan the route, or generate the control parameter. FIG. 11 is an exemplary schematic diagram of the tripod head 930 in the body 260 described in FIG. 9 according to some embodiments of the present disclosure. In some embodiments, the tripod head 930 may include a first pivot 1170 for controlling a rotation around a X axis, a second pivot 1150 for controlling a rotation around a Y axis, and a third pivot 1130 for controlling a rotation around a Z axis. The X axis may be a first axis in the horizontal plane, the Y axis may be a second axis in the horizontal plane, the Z axis may be a vertical axis perpendicular to the horizontal plane. In some embodiments, the tripod head 930 may include a connecting rod 1180 for connecting the pivot 1170 and the sensor, a connecting rod 1160 for connecting the pivot 1150 and the pivot 1170, and a connecting rod 1140 for connecting the pivot 1130 and the pivot 1150. In some embodiments, the tripod head 930 may include a connector 1110, a connecting rod 1114, and a dynamic Z-buffer bar 1120. In some embodiments, the sensor may be integrated into the user device 130 (e.g., a smartphone). The user device 130 may include the sensor, such as the imaging sensor 810, the accelerometer 820, the gyroscope 830, and the navigation sensor 880. The tripod head 930 may also include a connection block 1190 to support the user device 130. During the operation of the tripod head 930, the sensor in the user device 130 may obtain the information. In some embodiments, the sensor in the user device 130 may be controlled by adjusting an orientation of the tripod head 930 to obtain suitable information. In some embodiments, the orientation of the tripod head 930 may be adjusted by rotating the pivot 1170, the pivot 1150, and the pivot 1130 around the X, Y, and Z axes.

A traditional 3-axis tripod head may be used for aerial photography. To maintain a stability of the tripod head 930 during a route motion, the dynamic Z-buffer connecting rod 1120 may be used in the tripod head 930. The dynamic Z-buffer connecting rod 1120 may maintain the stability of the tripod head 930 along the Z axis. In some embodiments, the dynamic Z-buffer connecting rod 1120 may be a telescopic rod that may expand and contract along the Z axis. An operating method of the dynamic Z-buffer connecting rod 1120 in the tripod head 930 may be described in FIG. 20. The rotation and vertical movement of the pivots 1130, 1150, and 1170 of the dynamic Z-buffer connecting rod 1120 may be controlled based on the control parameter generated by the intelligent robot control module 330.

Figure 12:
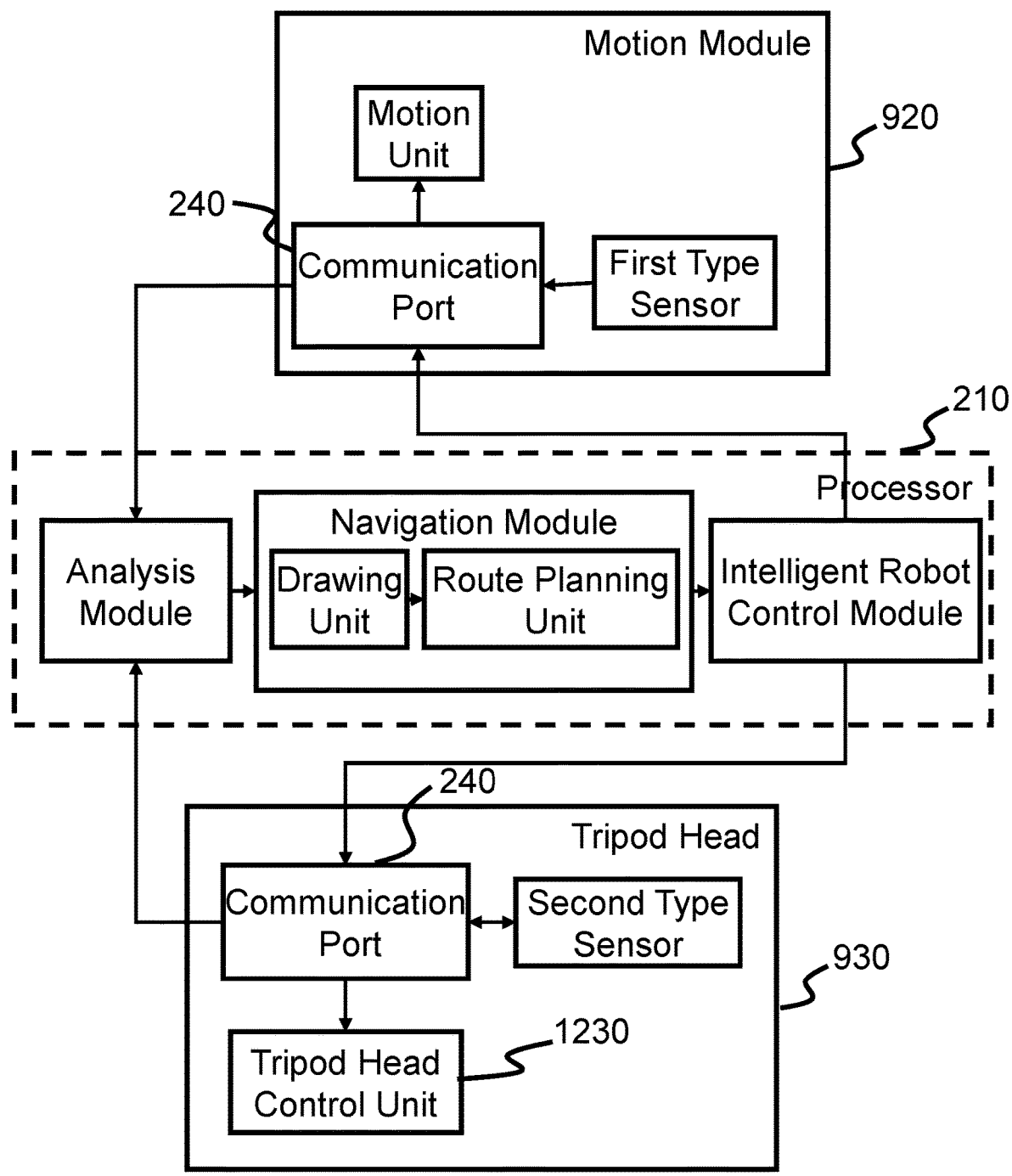
FIG. 12 is a schematic diagram illustrating a robot system according to some embodiments of the present disclosure.

The intelligent robot 110 may have a plurality of modules and units. FIG. 12 illustrating a simple system of the intelligent robot 110 according to some embodiments of the present disclosure. As shown in FIG. 12, the intelligent robot 110 may include the processor 210, the motion module 920, and the tripod head 930. In some embodiments, the processor 210 may include the analysis module 310, the navigation module 320, and the intelligent robot control module 330. The motion module 920 may include a motion unit 1210, a first type sensor 1220, and the communication port 240. The tripod head 930 may include a tripod head control unit 1230, the communication port 240, and a second type sensor 1240. In some embodiments, the processor 210 may send a control parameter to control the motion unit 1210 in the motion module 920 and the tripod head control unit 1230 in the tripod head 930.

In some embodiments, the first type sensor 1220 and the second type sensor 1240 may obtain information. The analysis module 310 may process the obtained information and construct a map. In some embodiments, the constructed map may be sent to the database 140. In order to determine a route to the destination, the map may be required for navigation. The analysis module 310 may download a latest map from the database 140 and send the latest map to the navigation module 320. The navigation module 320 may process the latest map and determine the route from the location of the intelligent robot to the destination. In some embodiments, the analysis module 310 may not download the complete map. A portion of the complete map including the location and the destination of the intelligent robot may be sufficient for planning the route. In some embodiments, the map constructed by the analysis module 310 may include the location and the destination of the intelligent robot 110, and the map may be the latest map in the database. The map constructed by analysis module 310 may be sent to the navigation module 320 to plan the route. The navigation module 320 may include the drawing unit 510 and the route planning unit 520. In some embodiments, the drawing unit 510 may generate the 2D map for route planning based on the latest map or the constructed map from the analysis module 310. The route planning unit 520 may plan the route. The route may be sent to the intelligent robot control module 330. The intelligent robot control module 330 may divide the route into one or more segments. The intelligent robot control module 330 may generate the control parameter for each segment of the route. The each segment may have the start point and the end point. The end point of the segment may be the start point of the next segment. In some embodiments, the end point of the intelligent robot 110 in a segment may not match the preset end point of the segment, which may affect the planning of a remaining part of the route. Thus, it is necessary to re-route the route based on the location of the mismatch (the new location of the intelligent robot 110) and the destination. In some embodiments, after moving the segment of the route, if the mismatch is detected, the re-routing process may be performed by the navigation module 320.

In some embodiments, if the first type sensor 1220 in the motion module 920 and the second type sensor 1240 in the tripod head 930 are unstable, the information captured by the first type sensor 1220 in the motion module 920 and the second type sensor 1240 in the tripod head 930 may not be suitable for constructing the map. In order to stabilize the first type sensor 1220 and the second type sensor 1240, the intelligent robot control module 330 may generate the control parameter to adjust the motion module 920 and the tripod head 930.

The sensor may be mounted on the motion module 920 and the tripod head 930. In some embodiments, the first type sensor 1220 may include at least one of the accelerometer 820, the gyroscope 830, the sonar 840, the infrared distance sensor 850, the optical flow sensor 860, the laser radar 870, and the navigation sensor 880. In some embodiments, the second type sensor 1240 may include at least one of the imaging sensor 810, the accelerometer 820, the gyroscope 830, the sonar 840, the infrared distance sensor 850, the optical flow sensor 860, the laser radar 870, and the navigation sensor 880.

As shown in FIG. 12, the processor 210 may establish a communication between the motion module and the tripod head 930 via the communication port 240. In some embodiments, the communication port 240 may be in any form. For example, the communication port 240 may be a wired or wireless transceiver. In some embodiments, the communication port 240 may be in the form of the interface for interactive communication. For example, the communication port 240 may establish the communication between the processor 210 and other components of the intelligent robot 110 by running a circuitry of the application program interface (API). In some embodiments, the API may be a set of subroutine definitions, protocols, and tools for building software and application programs. In some embodiments, the API may make the development of the program simpler by providing all the components. The components may be assembled. In some embodiments, an API protocol may be used to design a circuit for a wireless communication. For example, the wireless circuit may be Wi-Fi, Bluetooth, infrared (IR), ultra-wideband (UWB), wireless personal area network (ZigBee), or the like, or may also be a mobile communication module, such as 3G, 4G, and the Long Term Evolution (LTE). The API may separate a bottom hardware (e.g., the motion module 920 or the tripod head) and a control hardware (e.g., the processing module 210). In some embodiments, the processing module 210 (e.g., a portion of the smartphone) may control the motion of the wheel in the motion module 920 and the pose of the imaging sensor (e.g., the camera) in the tripod head 930 by invoking the API in the communication port 240. In some embodiments, the first type sensor 1220 in the motion module 920 may send information (e.g., location data) to the smartphone. In some embodiments, the second type sensor 1240 in the tripod head 930 may send information (e.g., a camera pose) to the smartphone.

Figure 13:
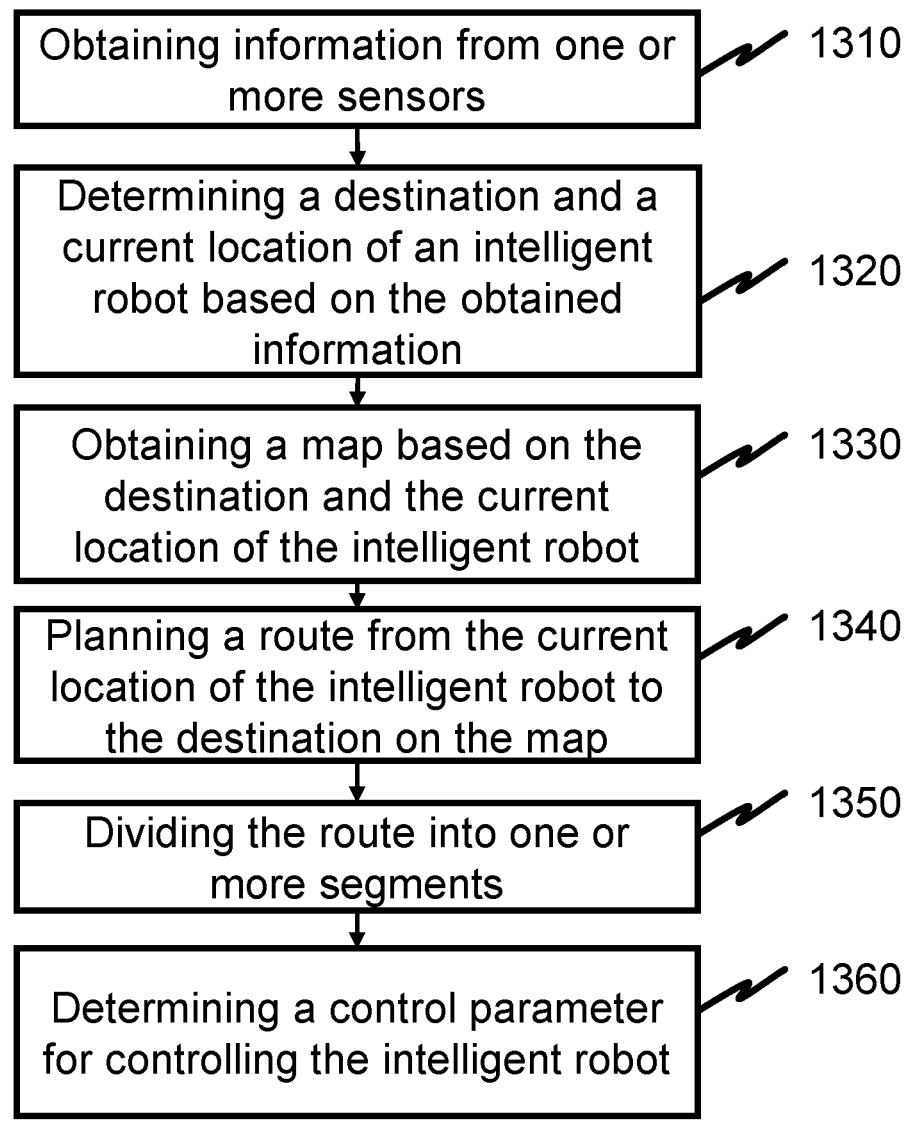
FIG. 13 is a flowchart illustrating an exemplary process for determining a control parameter of a control robot according to some embodiments of the present disclosure.

FIG. 13 is a flowchart illustrating an exemplary process for determining a control parameter for controlling an intelligent robot according to some embodiments of the present disclosure. Operation 1300 described in FIG. 13 may be implemented by the processor 210 in the intelligent robot 110 according to instructions stored in the storage 220.

In step 1310, the processor 210 may obtain information from the sensor(s) 230 (the first type sensor 1220 and/or the second type sensor 1240). As described in FIG. 3 and FIG. 12, the analysis module 310 in the processor 210 may receive the information from the motion module 920 and the tripod head 930 via the API communication port 240. In some embodiments, the movement of the intelligent robot 110 may be controlled by analyzing the information. In some embodiments, the stability of the motion module 920 and the tripod head 930 in the intelligent robot 110 may be maintained by analyzing the information.

In step 1320, the processor 210 may determine a destination and a current location of the intelligent robot 110 based on the received information. For example, the analysis module 310 in the processor 210 may receive the location data from the sensor(s) 230. The sensor may include but is not limited to a sonar, an infrared distance sensor, an optical flow sensor, a laser radar, a navigation sensor, or the like. In some embodiments, the user may determine the destination via the input/output (I/O) interface 250. For example, the user may enter the destination for the intelligent robot 110. The processor 210 may provide a route for the intelligent robot 110 by using the user-defined destination information. In some embodiments, the processor 210 may determine the current location of the intelligent robot 110 based on the received information. In some embodiments, the processor 210 may determine the current location of the intelligent robot 110 based on the information obtained from the sensor(s) 230. For example, the processor 210 may determine a coarse location of the intelligent robot based on the information obtained by the navigation sensor 880 in the positioning system (e.g., GPS). As another example, the processor 210 may determine a precise location of the intelligent robot 110 based on the information obtained by at least one of the sonar 840, the infrared distance sensor 850, and the optical flow sensor 860.

In step 1330, the processor 210 may obtain a map based on the destination and the current location of the intelligent robot 110. The map may be used to plan the route. In some embodiments, a complete map including a large number of points representing a city may be stored in the database 140. After determining the destination and the current location of the intelligent robot 110 by performing step 1310 and step 1320, the map including the destination and the current location of the intelligent robot 110 may be required to plan the route from the current location to the destination. In some embodiments, the map including the destination and the current location of the intelligent robot 110 may be a part of the complete map. In some embodiments, the analysis module 310 in the processor 210 may obtain a suitable portion of the complete map from the database 140 based on the destination and the current location of the intelligent robot 110. In some embodiments, the analysis module 310 may construct the map based on the information obtained from the sensor(s) 230. The constructed map may be sent to the database 140 to update the complete map. In some embodiments, the constructed map may include the destination and the current location of the intelligent robot 110. The navigation module 320 may use the constructed map to plan the route.

In step 1340, the route from the current location of the intelligent robot 110 to the destination may be planned based on the map obtained in step 1330. The route planning may be performed by the navigation module 320. In some embodiments, the navigation module 320 may convert the obtained map into a two-dimensional map by the drawing unit 510. The route planning unit 520 may then determine the route from the current location of the intelligent robot 110 to the destination based on the two-dimensional map.

In step 1350, the intelligent robot control module 330 may divide the planned route into one or more segments. The route division may be performed based on a threshold. For example, if the planned route is less than the threshold, the route division operation may not be performed. In some embodiments, the route division may be performed by the intelligent robot control module 330 based on the instructions stored in the storage module 220.

In step 1360, the intelligent robot control module 330 may determine a control parameter for controlling the robot based on the segmented route determined in step 1350. In some embodiments, each segment divided by the intelligent robot control module 330 in step 1350 may have a start point and an end point. In some embodiments, the intelligent robot control module 330 may determine the control parameter of the intelligent robot on the segment based on the start point and the end point of the segment. More descriptions of the determination of the control parameter between two points may refer to the detailed description in FIG. 6 and FIG. 7. In some embodiments, the control parameter may need to be adjusted according to time. For example, when the intelligent robot 110 passes through two points on a straight line on the segment, the intelligent robot 110 may use different motion speeds in different time periods from a first point to a second point. In some embodiments, the control parameter may be used to keep the intelligent robot stable during the movement along the planned route. For example, by maintaining the stability of the motion module 920 and the tripod head 930, the sensing information may be obtained relatively accurate. As another example, when the route is not flat, the control parameter may be used to stabilize the tripod head 930 in a direction perpendicular to the ground.

In some embodiments, when the intelligent robot passes the segment based on the preset control parameter, the intelligent robot 110 may stop at a position that does not match the preset end point of the segment determined by the intelligent robot control module 330. The navigation module 320 may re-plan a new route based on the mismatched location of the intelligent robot and the destination. The intelligent robot control module 330 may further divide the newly planned route into one or more segments. The intelligent robot control module 330 may also determine the control parameter of the intelligent robot for the one or more segments. In some embodiments, after the intelligent robot 110 passes each segment, the matching error of the location may be estimated by comparing the actual location of the intelligent robot and the preset end point of the segment.

Figure 14:
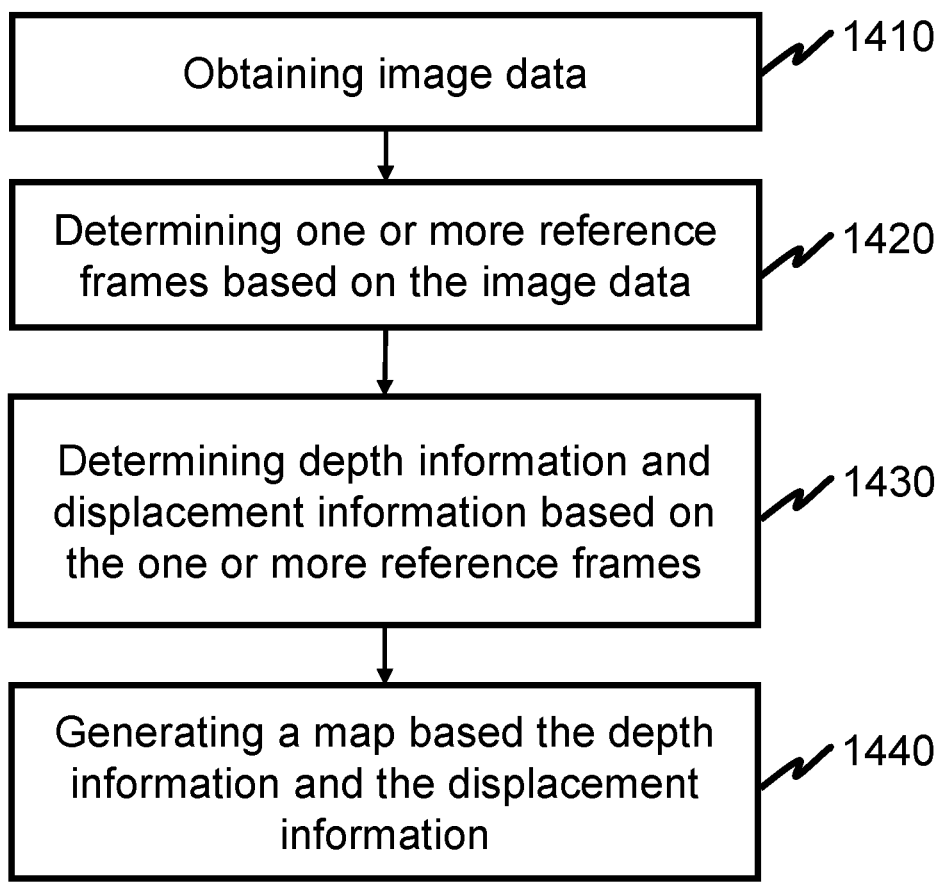
FIG. 14 is a flowchart illustrating an exemplary process for constructing a map according to some embodiments of the present disclosure.

FIG. 14 is a flowchart illustrating an exemplary process for generating a map by the processor 210 according to some embodiments of the present disclosure. The operation for constructing the map may be performed by the analysis module 310 based on the information obtained by the sensor(s) 230.

In step 1410, the analysis module 310 may obtain image data from the imaging sensor 810. In some embodiments, the image data may include a large number of frames, an initial depth and/or a displacement of each pixel point in each frame. The displacement may include a displacement of the wheel and a displacement of the camera relative to the wheel. In some embodiments, the initial depth may be set as a zero matrix. In some embodiments, if the sensor(s) 230 includes the laser radar or the camera with a depth detection function, the depth information may be obtained by the sensor.

In step 1420, the analysis module 310 may determine one or more reference frames based on the image data. In some embodiments, the image data may include the plurality of frames, the initial depth and/or the displacement of each pixel point in the each frame. In some embodiments, the analysis module 310 may select the one or more reference frames from the plurality of frames. More descriptions may be found elsewhere in the present disclosure (e.g., FIG. 15, and descriptions thereof). In some embodiments, the reference frames may be used to construct a map.

In step 1430, the analysis module 310 may determine depth information and displacement information based on the one or more reference frames. That is, in order to obtain the displacement information and the depth information of each frame, the image data may be processed by the analysis module 310. More descriptions of the determination of the displacement information and the depth information may be found elsewhere in the present disclosure (e.g., FIG. 4 and descriptions thereof).

In step 1440, the analysis module 310 may generate the map based on the one or more reference frames, the depth information, and the displacement information of the frames. In some embodiments, the three-dimensional map may be obtained by concatenating one or more reference frames with the corresponding displacements.

The map may be determined by the plurality of frames and corresponding displacement information and depth information. In some embodiments, the order of step 1420 and step 1430 may be reversed, or performed simultaneously. For example, the process for determining the displacement information and the depth information in step 1420 may also include the process for determining the one or more reference frames in step 1430. That is, step 1430 may be a sub-step of step 1420 for determining the one or more reference frames. As described in the description of FIG. 4, the image data may be processed to obtain one or more results. In some embodiments, the one or more results may include the displacement information (e.g., a camera displacement between two adjacent frames) and the depth information (e.g., a depth of an object in the two adjacent frames). In some embodiments, the one or more results may be adjusted by the g2o closed loop detection technique to generate an adjusted displacement information. In some embodiments, the adjusted displacement may be used as the displacement information to generate the map. The analysis module 310 may generate the map based on the one or more reference frames and corresponding displacement information and depth information.

Figure 15:
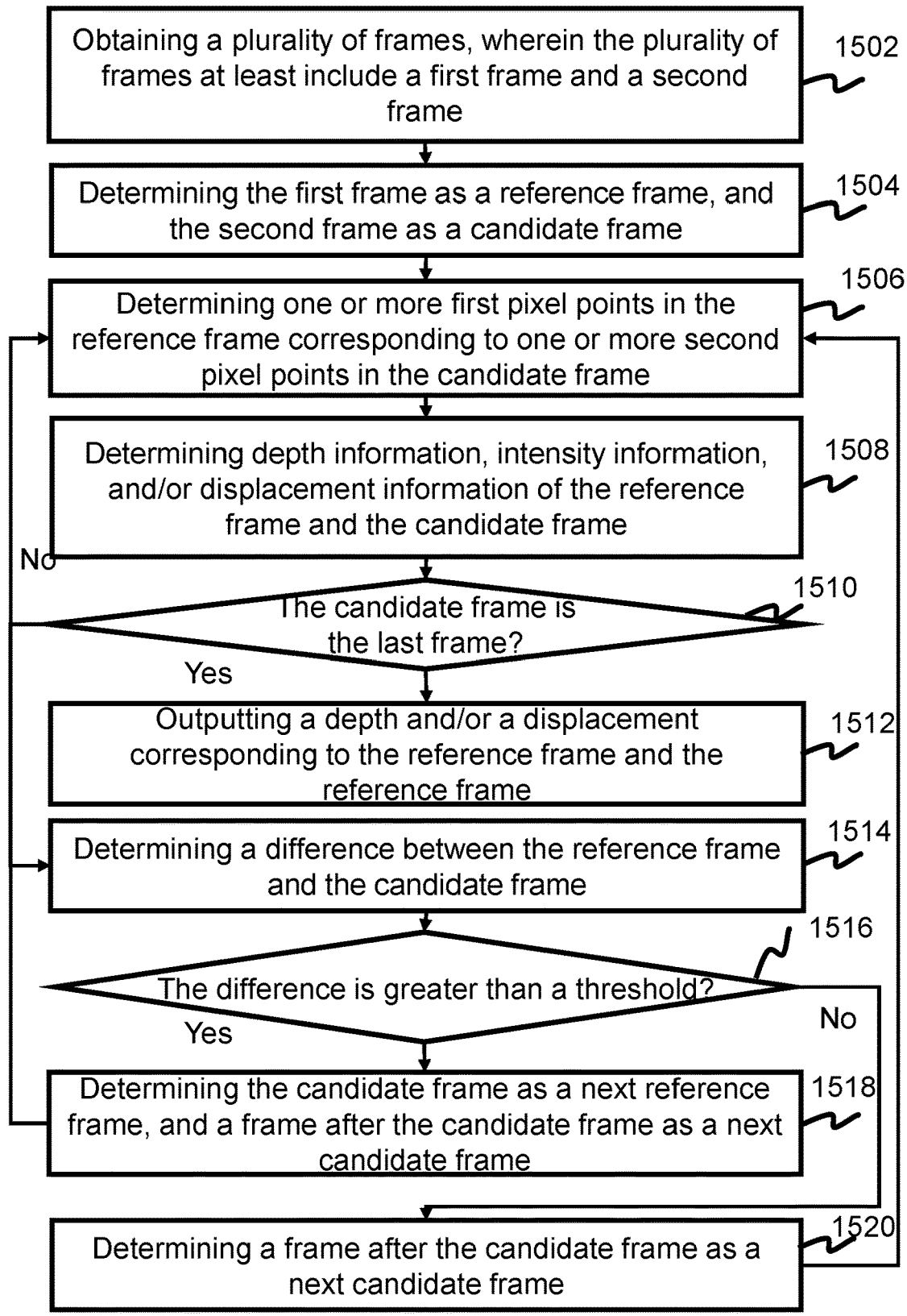
FIG. 15 is a flowchart illustrating an exemplary process for determining one or more reference frames according to some embodiments of the present disclosure.

FIG. 15 is a flowchart illustrating an exemplary process for determining one or more reference frames according to some embodiments of the present disclosure. This operation may be performed by the analysis module 310, the displacement determination unit 420, and the depth determination unit 430 based on image data obtained by the imaging sensor 810. Specifically, the analysis module 310 may determine the one or more reference frames based on the one or more results (e.g., the displacement information and the depth information).

In step 1502, the analysis module 310 may obtain image data including a plurality of frames. The plurality of frames may include at least one first frame and one second frame. In some embodiments, the first frame may be an existing frame, and the second frame may be a continuous frame of the first frame. That is, the imaging sensor 810 may capture the first frame at a time point and capture the second frame at a next time point. That is, the plurality of frames may be adjacent to each other in a time domain.

In step 1504, the analysis module 310 may determine the first frame as a reference frame and the second frame as a candidate frame.

In step 1506, the analysis module 310 may determine one or more first pixel points in the reference frame corresponding to one or more second pixel points in the candidate frame. In some embodiments, the reference frame and the candidate frame may have an overlapping region. In this situation, the first pixel point and the second pixel point may refer to a same position of an object in the overlapping region of the reference frame and the candidate frame. In some embodiments, the one or more first pixel points may be a set of pixel points Ω as described in FIG. 4. In some embodiments, the reference frame and the candidate frame may not have the overlapping region. That is, any region in the reference frame may not correspond to any region in the candidate frame. In this situation, the pixel points in the reference frame and the candidate frame may not be selected as the first pixel point and/or the second pixel point.

In step 1508, the analysis module 310 may determine the depth information, the intensity information, and/or the displacement information of the reference frame and the candidate frame. In some embodiments, more descriptions of the determination of the depth information, the intensity information, and/or the displacement information may be found in the descriptions of FIG. 4.

In step 1510, the analysis module 310 may determine whether the candidate frame is the last frame. Specifically, the analysis module 310 may determine whether a next frame of the candidate frame exists in the time domain. If the candidate frame has the next frame, the process may proceed to step 1512, otherwise, the process may proceed to step 1514.

In step 1512, if the next frame of the candidate frame is determined to be the last frame, the analysis module 310 may output a depth and/or a displacement corresponding to the reference frame and the reference frame.

In step 1514, the analysis module 310 may determine a difference between the reference frame and the candidate frame. In some embodiments, the difference between the reference frame and the candidate frame may be determined based on the intensity information of the reference frame and the candidate frame. In some embodiments, the intensity of the reference frame may be determined by the RGB intensity of the one or more first pixel points. The intensity of the candidate frame may be determined by the RGB intensity of the one or more second pixel points. In some embodiments, the intensity information of the reference frame and the candidate frame may be determined by performing step 1504. In some embodiments, the process for determining the intensity information of the reference frame and the candidate frame in step 1514 may be performed before the process for determining the difference between the reference frame and the candidate frame.

In step 1516, the analysis module 310 may determine whether the difference between the reference frame and the candidate frame is greater than the threshold. If the difference between the reference frame and the candidate frame is greater than the threshold, the process may proceed to step 1518. Otherwise, the process may proceed to step 1520.

In step 1518, if the difference between the reference frame and the candidate frame is greater than the threshold, the analysis module 310 may determine the candidate frame as an updated reference frame, and the frame after the candidate frame as the updated candidate frame. In some embodiments, the frame after the candidate frame may be adjacent to the candidate frame. At this time, the updated reference frame and the updated candidate frame may be sent to step 1506, and process 1500 may be repeated.

In step 1520, if the difference between the reference frame and the candidate frame is not greater than the threshold, the analysis module 310 may determine the frame after the candidate frame as the updated candidate frame. At this time, the updated reference frame and the updated candidate frame may be sent to step 1506, and process 1500 may be repeated.

In some embodiments, a new reference frame and a new candidate frame outputted in step 1518 or step 1520 may be processed by the analysis module 310. In some embodiments, when the difference between the reference frame and the candidate frame is greater than the threshold, the new reference frame may be obtained by replacing the reference frame with the candidate frame. In some embodiments, the new candidate frame may be obtained by replacing the candidate frame with the next frame of the candidate frame. That is, the replacement of the candidate frame may be unconditional, and the replacement of the reference frame may be conditional.

When the map is obtained in step 1512, process 1500 may be terminated. In some embodiments, in order to terminate the process 1500 in time, a plurality of termination conditions may be determined. For example, a counter may be used in process 1500, such that the number of cycles of the process 1500 is not greater than a predetermined threshold.

Figure 16:
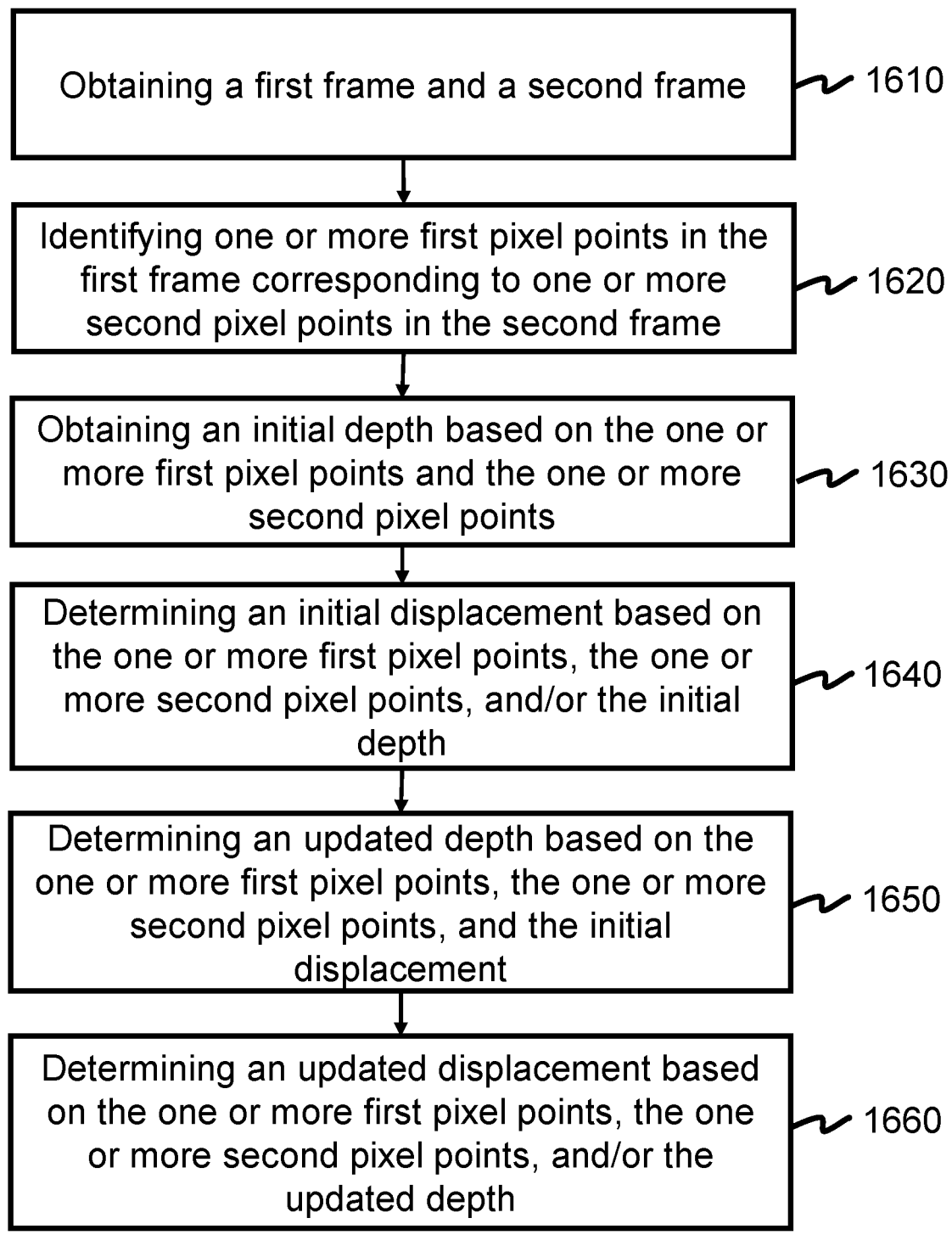
FIG. 16 is a flowchart illustrating an exemplary process for obtaining depth information, strength information, and displacement information according to some embodiments of the present disclosure.

FIG. 16 is a flowchart illustrating an exemplary process for obtaining depth information and displacement information of a reference frame and/or a candidate frame according to some embodiments of the present disclosure. In some embodiments, the process may be performed by the analysis module 310. In some embodiments, the process may be similar to the process for obtaining the displacement and the depth of the frame as described in FIG. 4.

In step 1610, the analysis module 310 may obtain a first frame and a second frame from a plurality of frames obtained from the imaging sensor 810. In some embodiments, the analysis module 310 may select the first frame and the second frame from the plurality of frames captured by an imaging sensor. In some embodiments, the first frame and the second frame may be adjacent to each other in a time domain. The first frame may be an existing frame, and the second frame may be a continuous frame.

In step 1620, the analysis module 310 may identify one or more first pixel points in the first frame corresponding to one or more second pixel points in the second frame. The pixel points in the first frame corresponding to the pixel points in the second frame may be identified by performing step 1506 as described in FIG. 15.

In step 1630, the analysis module 310 may obtain an initial depth based on the one or more first pixel points and the one or more second pixel points. In some embodiments, the initial depth may be set as a zero matrix. In step 1640, the analysis module 310 may determine an initial displacement based on the one or more first pixel points, the one or more second pixel points, and/or the initial depth. For example, step 1640 may be implemented by the function (1) described in FIG. 4.

In step 1650, the analysis module 310 may determine an updated depth based on the one or more first pixel points, the one or more second pixel points, and the initial displacement. In some embodiments, step 1650 may be implemented by the function (2) described in FIG. 4.

In step 1660, the analysis module 310 may determine an updated displacement based on the one or more first pixel points, the one or more second pixel points, and/or the updated depth. In some embodiments, step 1660 may be implemented by the function (1) described in FIG. 4, that is, the initial depth may be replaced by the updated depth.

As described in FIG. 4, in order to determine the displacement by the function (1), the initial displacement may be obtained firstly. As shown in function (1), the initial displacement may be determined based on the initial value of the displacement. FIG. 17A is a flowchart illustrating an exemplary process for determining an initial value of a displacement according to some embodiments of the present disclosure. This process may be performed by the analysis module 310 based on image data obtained by the imaging sensor 810.

In step 1710, image data may be obtained from the analysis module 310. In some embodiments, an initial value of the displacement may be determined based on the image data. Specifically, the initial value of the displacement may be determined based on the displacement in the image data. In some embodiments, the displacement in the image data may include the displacement of the motion unit (e.g., the two wheels) and the displacement of the camera relative to the motion unit during a time interval in which the two adjacent frames are obtained.

In step 1720, the analysis module 310 may obtain a first displacement associated with the motion unit based on the image data. In some embodiments, the first displacement associated with the motion unit may be a displacement of a center of two wheels over a time period. In some embodiments, the first displacement associated with the motion unit may be a displacement of a point within the time period. The point may be configured with a navigation sensor. In some embodiments, the navigation sensor may be located at the center of the two wheels. In some embodiments, the time period may be a time interval at that the imaging sensor 810 obtains the two frames.

In step 1730, the analysis module 310 may obtain a second displacement associated with the imaging sensor 810 relative to the motion unit. In some embodiments, the second displacement may be the relative displacement of the imaging sensor 810 relative to the motion unit. In some embodiments, the imaging sensor 810 may be a camera.

In step 1740, the analysis module 310 may determine a third displacement associated with the imaging sensor 810 based on the first displacement and the second displacement. In some embodiments, the third displacement may be a vector sum of the first displacement and the second displacement. In some embodiments, the initial value of the initial displacement may be determined based on the third displacement.

During the movement of the intelligent robot 110, a precise posture of the intelligent robot 110 may be obtained by controlling the tripod head. In some embodiments, the posture of the intelligent robot 110 may be controlled by controlling a rotation angle of a shaft in the tripod head 930. FIG. 17B is a flowchart illustrating an exemplary process for determining a posture of the intelligent robot 110 according to some embodiments of the present disclosure. The process may be performed by the analysis module 310 based on a rotation angle of an axis of the tripod head 930.

In step 1715, the image data may be obtained from the analysis module 310. As described in FIG. 17A, the image data may include the frame, the displacement, and the initial depth. In some embodiments, the image data may also include rotation information.

In step 1725, the analysis module 310 may obtain a first rotation angle relative to a reference axis. The first rotation angle may be related to the motion unit based on the image data. In some embodiments, the first rotation angle of the reference axis related to the motion unit may be obtained based on the rotation information in the image data. In some embodiments, the first rotation angle may be an angle within a time period. In some embodiments, the time period may be a time interval at that the imaging sensor 810 obtains the two frames.

In step 1735, the analysis module 310 may obtain a second rotation angle relative to the motion unit over a time period. The motion unit may be related to the imaging sensor. In some embodiments, the second rotation angle may be a relative rotation angle of the imaging sensor 810 with respect to the motion unit. In some embodiments, the imaging sensor 810 may be a camera.

In step 1745, the analysis module 310 may determine a third rotation angle relative to the reference axis. The reference axis may be related to the imaging sensor 810. In some embodiments, the third rotation angle may be determined based on the first rotation angle and the second rotation angle. In some embodiments, the third rotation angle may be a vector sum of the first rotation angle and the second rotation angle.

During the movement of the intelligent robot 110, the motion module 820 and the tripod head 930 may be configured with the sensor(s) 230 to obtain the information. In some embodiments, the sensor(s) 230 may be located in the carrier 1010 or a smart phone supported by the tripod head 930. In some embodiments, the motion module 920 and the tripod head 930 may require a full range of stability measures to obtain the accurate and reliable information. More description for maintaining the balance of the motion module 920 and the tripod head 930 with respect to the horizontal plane may be found in the descriptions of FIG. 18.

Figure 18:
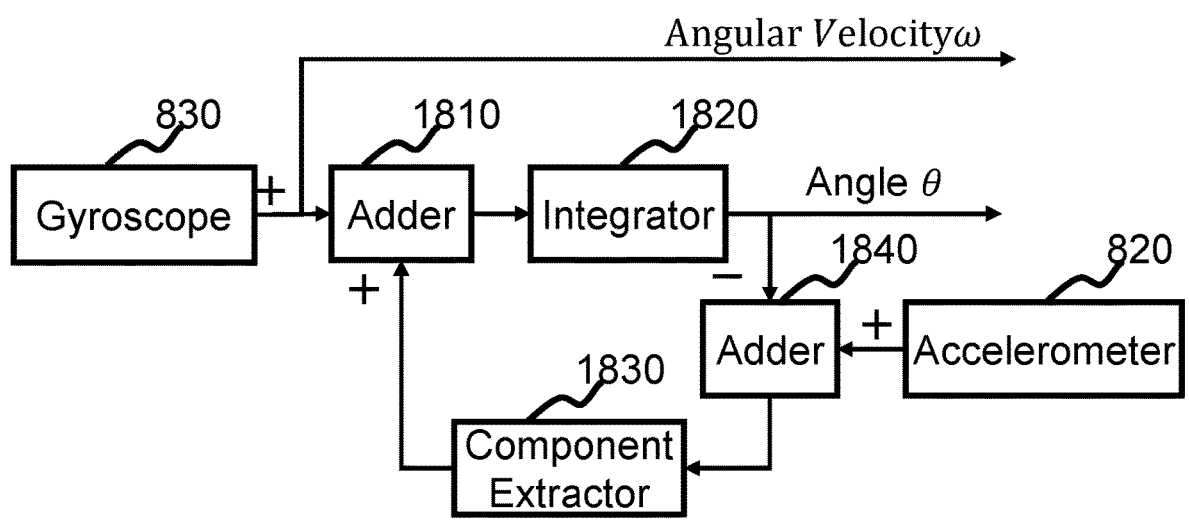
FIG. 18 is a schematic block diagram illustrating an exemplary process for determining an included angle between a horizontal plane and a Z axis by a gyroscope and an accelerometer according to some embodiments of the present disclosure.

FIG. 18 is a block diagram illustrating an exemplary process for determining an included angle between a horizontal plane and a Z axis by a gyroscope and an accelerometer according to some embodiments of the present disclosure. In some embodiments, the horizontal plane may be a mounting surface of the carrier 1010. The included angle between the horizontal plane and the Z axis may be determined based on the gyroscope data and the accelerometer data. In some embodiments, the horizontal plane may be a relative plane that the tripod head 930 detects a pitch angle of the tripod head 930.

As shown in FIG. 18, the system may include an adder 1810, an integrator 1820, a component extractor 1830, and an adder 1840. The adder 1810, the integrator 1820, the component extractor 1830, and the adder 1840 may form a feedback loop for determining an output angle. The integrator 1820 may obtain the included angle between the horizontal plane and the Z axis in each frame obtained by the imaging sensor 810. It is assumed that the imaging sensor 810 obtains the first frame at a time point t1, and the second frame at a time point t2. The gyroscope 830 and the accelerometer 820 may obtain an angular velocity and angled information at the time pints t1 and t2. In some embodiments, a feedback output angle $\theta_1$ related to the first frame obtained at the time point t1, the gyroscope data and the accelerometer data obtained at the time point t2 may be used to determine an output angle $\theta_2$ related to the second frame obtained at the time point t2.

First, the gyroscope data and the accelerometer data of the first frame may be processed at the time point t1. The integrator 1820 may generate an output angle $\theta_1$ related to the first frame. The accelerometer 820 may generate a first included angle $\theta_1'$. The adder 1840 may generate a second included angle $\theta_1''$ based on the output angle $\theta_1$ and the first included angle $\theta_1'$. In some embodiments, the second included angle $\theta_1''$ may be determined by subtracting a vector of the output angle $\theta_1$ from the first included angle $\theta_1'$. The component extractor 1830 may determine a compensation angular velocity $\omega_1''$ based on the second included angle $\theta_1''$. In some embodiments, the component extractor 1830 may be a differentiator.

Then, the gyroscope data and the accelerometer data of the second frame may be processed at the time point t2. The gyroscope 830 may generate an angular velocity $\omega_2$. The adder 1810 may generate a corrected angular velocity $\omega_2'$ based on the angular velocity $\omega_2$ and a compensated angular velocity $\omega_1''$. In some embodiments, the corrected angular velocity $\omega_2'$ may be determined by adding a vector of the angular velocity $\omega_2$ and the compensation angular velocity $\omega_1''$. Finally, the integrator 1820 may output an included angle $\theta_2$ related to the second frame at the time point t2 based on the corrected angular velocity $\omega_2'$.

In some embodiments, the method described in FIG. 18 may be performed by the processor 210. For example, the gyroscope data and the accelerometer data may be transmitted to the processor 210 via an API interface (e.g., a part of a smartphone). When each frame is obtained, the processor 210 may determine the output angle. In some embodiments, the included angle between the horizontal plane and the Z axis may be detected when each frame is obtained. The balance of the system on the horizontal plane may be maintained based on the real-time output angle related to the each frame.

Figure 19:
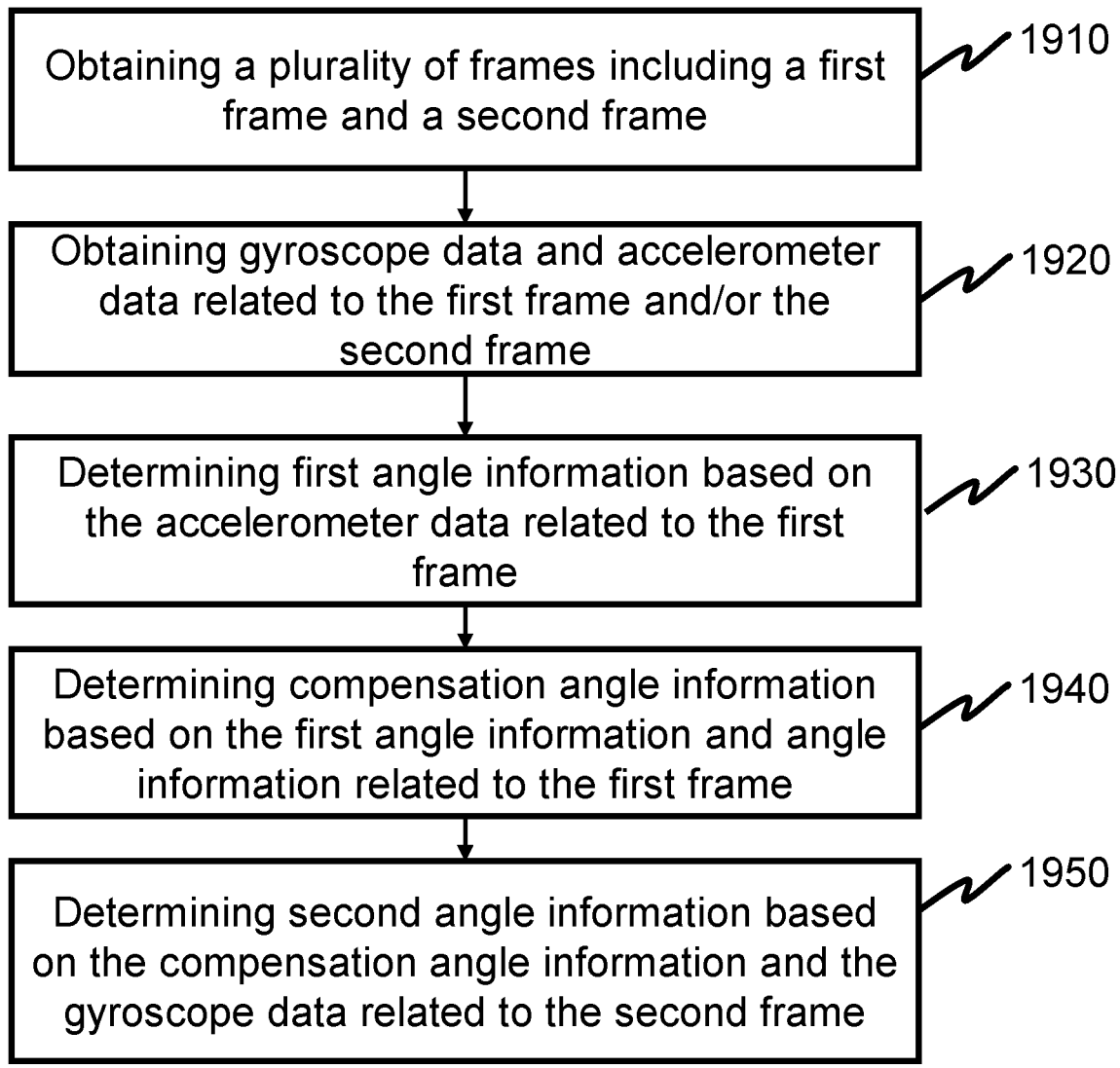
FIG. 19 is a flowchart illustrating an exemplary process for determining an angle corresponding to a reference frame according to some embodiments of the present disclosure.

FIG. 19 is a flowchart illustrating an exemplary process 1900 for determining an angle related to a frame. The process 1900 may be performed by the processor 210.

In step 1910, the processor 210 may obtain a plurality of frames including a first frame and a second frame transmitted from the imaging sensor 810. In some embodiments, the first frame and the second frame may be captured by the imaging sensor 810 at time intervals. For example, the imaging sensor 810 may capture a first frame at a time point $t_1$, and capture a second frame and at a time point $t_2$. The time between the time point $t_1$ and the time point $t_2$ may be a sampling interval of the imaging sensor 810.

In step 1920, the processor 210 may obtain gyroscope data and accelerometer data related to the first frame and/or the second frame. In some embodiments, the gyroscope data and the accelerometer data may include parameters such as an angular velocity and an angle.

In step 1930, the processor 210 may determine first angle information based on the accelerometer data related to the first frame. In some embodiments, the first angle information may include a first angle.

In step 1940, the processor 210 may determine compensation angle information based on the first angle information and the angle information related to the first frame. In some embodiments, the angle information related to the first frame may be an output angle related to the first frame. In some embodiments, the first angle information may be processed by subtracting the output angle related to the first frame by a vector. In some embodiments, the compensation angle information may be a compensation angle speed. The compensation angle speed may be determined by subtracting the output angle related to the first frame from the first angle information by the component extractor 1830.

In step 1950, the processor 210 may determine second angle information based on the compensation angle information and the gyroscope data related to the second frame. In some embodiments, at the time point $t_2$ of capturing the second frame, the second angle data may be the angle between the horizontal plane and the Z axis related to the second frame detected by the processor 210.

As shown in FIG. 18 and FIG. 19, the output angle related to the second frame may be fed back to the output angle related to the first frame. The processor 210 may obtain the output angle of the each frame based on the gyroscope data and the accelerometer data by using the loop form. In some embodiments, the included angle between the horizontal plane and the Z axis may exceed a certain threshold, and a balanced control signal may then be generated.

The process for maintaining the horizontal balance of the motion module 920 or the tripod head 930 is shown in FIG. 18 and FIG. 19. During the movement of the intelligent robot 110, the sensor installed in the smartphone supported by the tripod head 930 may obtain the information. In some embodiments, the information may include the image data, the gyroscope data, the accelerometer data, and the data obtained from other sensors. In order to obtain the information for the second type sensor 1240 in the smartphone stably, it is necessary to maintain the horizontal balance by the processor 210. On the other hand, for the second type sensor 1240 in the smartphone supported by the tripod head 930, the road may be uneven and the information may not be obtained stably. In some embodiments, in order to obtain the information for the sensor in the smartphone stably, it is necessary for the vertical axis to maintain balance.

Figure 20:
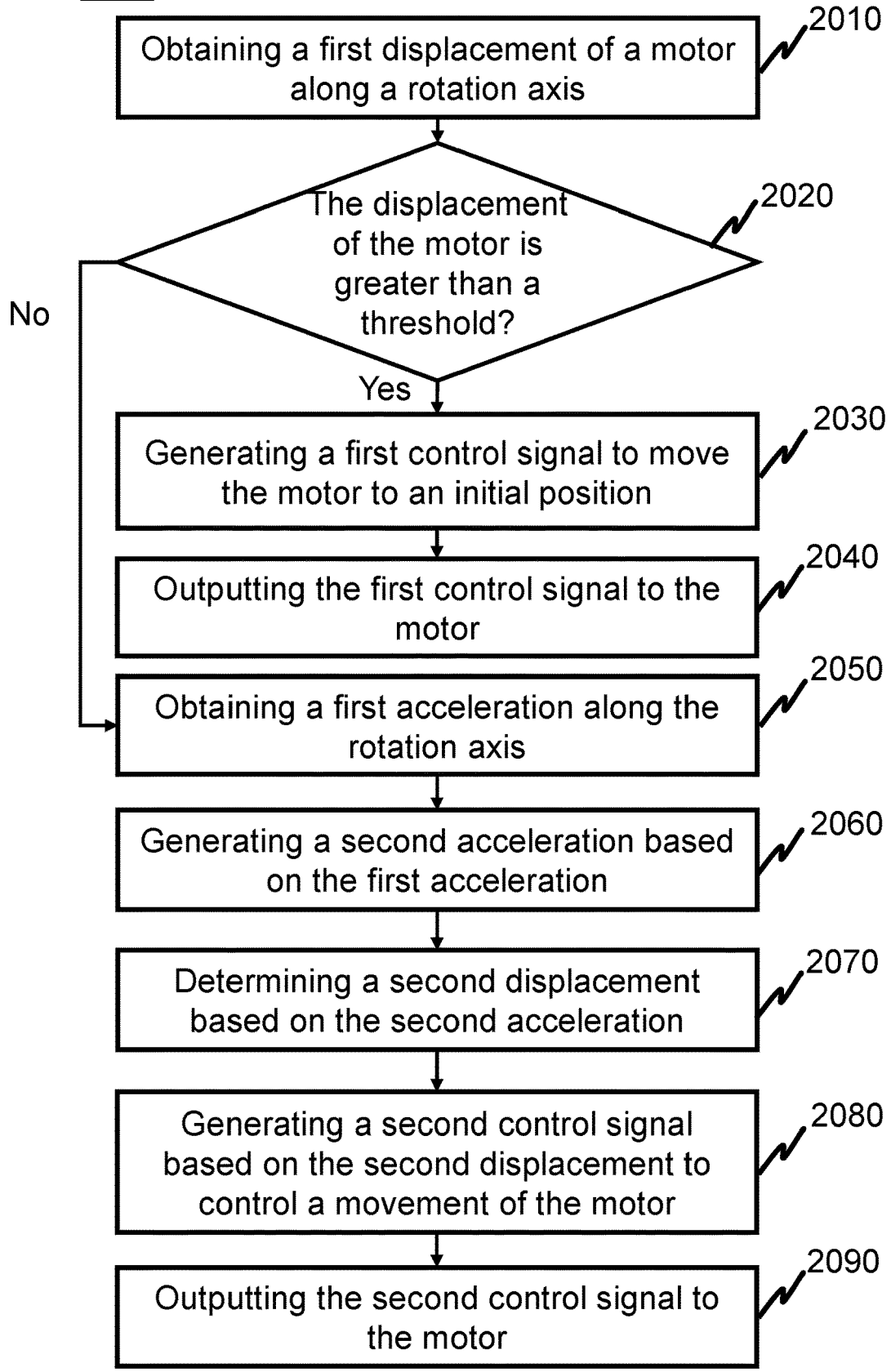
FIG. 20 is a flowchart illustrating an exemplary process for adjusting a vertical direction motion of a sensor in an intelligent device according to some embodiments of the present disclosure.

FIG. 20 is a flowchart illustrating an exemplary process 2000 for adjusting a vertical displacement of a second type sensor 1240 in a smartphone. In some embodiments, the method may be executed by the processor 210. The dynamic Z buffer bar 1120 illustrated in FIG. 11 may be controlled based on the control parameter generated by the intelligent robot control module 330.

In step 2010, the processor 210 may obtain a first displacement of a motor along a rotation axis. In some embodiments, the rotation axis may be a Z axis. The first displacement may be a vector along the Z axis.

In step 2020, the processor 210 may determine whether the displacement of the motor along the Z axis is greater than a threshold. In some embodiments, the threshold may be a limit value within that the second type sensor 1240 may obtain information stably.

In step 2030, in response to a determination that the displacement of the motor is greater than the threshold, the processor 210 may generate a first control signal to move the motor to an initial position. In some embodiments, the initial position may be a preset position suitable for obtaining information.

In step 2040, the processor 210 may output the first control signal to the motor to cause the second type sensor 1240 installed in the smartphone to return to the initial position to obtain the stable information.

In step 2050, in response to a determination that the displacement of the motor is not greater than the threshold, the processor 210 may obtain a first acceleration along the rotation axis. In some embodiments, the acceleration may be obtained by the accelerometer 820 installed in the smartphone.

In step 2060, the processor 210 may generate a second acceleration based on the first acceleration. In some embodiments, the second acceleration may be the filtered first acceleration.

In step 2070, the processor 210 may determine a second displacement based on the second acceleration. In some embodiments, the second displacement may be calculated based on an integrated value of the second acceleration. In some embodiments, the second displacement may be a vector along the Z axis.

In step 2080, the processor 210 may generate a second control signal based on the second displacement to control a movement of the motor. In some embodiments, the second control signal may determine a remaining gap of the displacement (a remaining movable range) based on the second displacement and a threshold. The processor 210 may control the sensor in the smartphone to move along the Z axis.

In step 2090, the sensor 210 may output the second control signal to the motor.

The present disclosure is described and illustrated using a plurality of embodiments and it will be appreciated that those skilled in the art may make various modifications in form and detail without departing from the spirit and scope of the present disclosure as defined in the appended claims and their equivalent description.

The invention claimed is:

1. A system, comprising:
   a motion module including a wheel, a carrier, and a first type sensor, wherein the wheel is connected to the carrier to provide a driving;
   a tripod head including a second type sensor;
   a processor including an analysis module, a navigation module, and a control module, configured to:
   establish a communication with the tripod head and the motion module, respectively;
   obtain information from the second type sensor and the first type sensor, respectively, to determine a destination and a location of the system;
   construct a map based on the information;
   plan a route for the system based on the map;
   determine a control parameter for the system based on the route and the information; and
   control a movement and a posture of the system based on the control parameter.

2. The system of claim 1, wherein the processor communicates with the tripod head and/or the motion module using an application program interface respectively.

3. The system of claim 1, further comprises:
   an imaging sensor; and
   the processor is further configured to:
   obtain a plurality of frames transmitted from the imaging sensor, wherein the plurality of frames include at least a first frame and a second frame;
   obtain gyroscope data and accelerometer data related to the first frame and/or the second frame;
   determine first angle information based on the accelerometer data related to the first frame;
   determine compensation angle information based on the first angle information and angle information related to the first frame;
   determine second angle information based on the compensation angle information and the gyroscope data related to the second frame; and
   control a balance of the motion module or the imaging sensor based on the second angle information.

4. The system of claim 1, wherein the processor is further configured to:
   obtain a first vertical displacement of a motor along a rotation axis;
   generate a first control signal to move the motor to an initial position when the first vertical displacement of the motor is greater than a threshold;
   obtain a first acceleration along the rotation axis when the first vertical displacement of the motor is not greater than the threshold;
   generate a second acceleration based on the first acceleration;
   determine a second vertical displacement based on the second acceleration; and
   generate a second control signal based on the second vertical displacement to control the movement of the motor.

5. The system of claim 1, wherein the wheel includes a left wheel and a right wheel.

6. The system of claim 5, wherein the left wheel and the right wheel include at least one swivel caster.

7. The system of claim 1, wherein the wheel is configured to be driven by at least one drive motor.

8. The system of claim 7, wherein the wheel and the at least one drive motor are connected by a hub or a pivot.

9. The system of claim 1, wherein the tripod head includes a first pivot, a second pivot, and a third pivot, wherein:
the first pivot controls a rotation around a first axis within a horizontal plane;
the second pivot controls a rotation around a second axis within the horizontal plane; and
the third pivot controls a rotation around a vertical axis perpendicular to the horizontal plane.

10. The system of claim 9, wherein the tripod head further includes a buffer bar configured to maintain stability of the tripod head at the vertical axis.

11. A method, comprising:
establishing a communication between a processor and a tripod head and a communication between the processor and a motion module, wherein the motion module includes a first type sensor, and the tripod head includes a second type sensor;
obtaining, by the processor, information from the second type sensor and the first type sensor respectively;
determining, by the processor, a destination and a location of the intelligent robot;
obtaining, by the processor, a map based on the information;
planning, by the processor, a route from the location of the intelligent robot to the destination based on the map;
determining a control parameter of the motion module and the tripod head based on the route and the information; and
controlling a movement and a posture of the intelligent robot based on the control parameter.

12. The method of claim 11, wherein the processor communicates with the tripod head and/or the motion module by using an application program interface respectively.

13. The method of claim 11, further comprising:
obtaining a plurality of frames transmitted from an imaging sensor, wherein the plurality of frames include at least a first frame and a second frame;
obtaining gyroscope data and accelerometer data related to the first frame and/or the second frame;
determining first angle information based on the accelerometer data related to the first frame;
determining compensation angle information based on the first angle information and angle information related to the first frame;
determining second angle information based on the compensation angle information and the gyroscope data related to the second frame;
controlling a balance of the motion module or the imaging sensor based on the second angle information.

14. The method of claim 11, further comprising:
obtaining a first vertical displacement of a motor along a rotation axis;
generating a first control signal to move the motor to an initial position when the first vertical displacement of the motor is greater than a threshold;
obtaining a first acceleration along the rotation axis when the first vertical displacement of the motor is not greater than the threshold;
generating a second acceleration based on the first acceleration;
determining a second vertical displacement based on the second acceleration; and
generating a second control signal based on the second vertical displacement to control the movement of the motor.

15. The method of claim 11, wherein the wheel includes a left wheel and a right wheel.

16. The method of claim 15, wherein the left wheel and the right wheel include at least one swivel caster.

17. The method of claim 11, wherein the wheel is configured to be driven by at least one drive motor.

18. The method of claim 17, wherein the wheel and the at least one drive motor are connected by a hub or a pivot.

19. The method of claim 11, wherein the tripod head includes a first pivot, a second pivot, and a third pivot, wherein:
the first pivot controls a rotation around a first axis within a horizontal plane;
the second pivot controls a rotation around a second axis within the horizontal plane; and
the third pivot controls a rotation around a vertical axis.

20. The method of claim 19, wherein the tripod head further includes a buffer bar configured to maintain stability of the tripod head at the vertical axis.

* * * * *